United States Patent [19]

Janko et al.

[11] Patent Number: 4,504,851
[45] Date of Patent: Mar. 12, 1985

[54] SYSTEM FOR MONITORING VIDEO SIGNAL PARAMETERS, INCLUDING THE LUMINANCE SIGNAL

[75] Inventors: Mike A. Janko; David K. Broberg, both of Oklahoma City, Okla.

[73] Assignee: Precision Electronics, Inc., Oklahoma City, Okla.LAHOMA

[21] Appl. No.: 508,921

[22] Filed: Jun. 29, 1983

[51] Int. Cl.³ .................. H04N 7/62; H04N 9/62
[52] U.S. Cl. ...................... 358/10; 358/139
[58] Field of Search ............. 358/10, 107, 139; 455/115

[56] References Cited

U.S. PATENT DOCUMENTS

| | | | |
|---|---|---|---|
| 3,452,278 | 6/1969 | Myers et al. | 324/77 A |
| 3,670,095 | 6/1972 | Arumugnam et al. | 358/10 |
| 3,673,320 | 6/1972 | Carnt et al. | 358/10 |
| 3,760,275 | 9/1973 | Ohsawa et al. | 358/10 |
| 3,868,567 | 2/1975 | Ekstrom | 324/77 A |
| 3,963,991 | 6/1976 | Allen et al. | 328/150 |
| 4,142,146 | 2/1979 | Schumann et al. | 324/121 R |
| 4,215,367 | 7/1980 | Schaffer et al. | 358/10 |
| 4,240,100 | 12/1980 | Gorbold et al. | 358/10 |
| 4,268,851 | 5/1981 | Heller et al. | 358/10 |
| 4,276,564 | 6/1981 | Watson | 358/10 |
| 4,340,903 | 7/1982 | Tamura | 358/10 |
| 4,364,080 | 12/1982 | Vidovic | 358/10 |

OTHER PUBLICATIONS

Measurement Techniques in TV Studios and Outside Broadcasts, by Teear, The Radio and Electronic Engineer, vol. 41, No. 3 (Mar. 1971), pp. 113-125.

Digital Automatic Measuring Equipment, by J. B. Watson, IBA Tech Rev. (GB), No. 09, Sep. 1976, pp. 50-54.

Automated and Digital Measurement of Baseband Transmission Parameters, by Charles W. Rhodes, SMPTE Journal, Nov. 1977, vol. 86, No. 11, pp. 832-835.

Primary Examiner—Tommy P. Chin
Attorney, Agent, or Firm—Dunlap & Codding

[57] ABSTRACT

A method and apparatus for monitoring selected parameters of a video signal wherein the video parameters to be monitored are movingly or randomly contained in the video signal outside the vertical blanking signals and wherein the video signal includes a least one of a luminance signal having positive peaks and negative peaks, a chrominance signal having a peak voltage value comprising: determining at least one video parameter selected from among: (1) an instantaneous peak voltage level of the positive peaks in the luminance signal; (2) an instantaneous peak voltage level of the negative peaks in the luminance signal; (3) the peak voltage value of the chrominance signal; and (4) combinations thereof. Each determined video parameter is compared with a reference DC voltage value selected to correspond with the determined video parameter and an output indication of each such comparison is provided.

26 Claims, 25 Drawing Figures

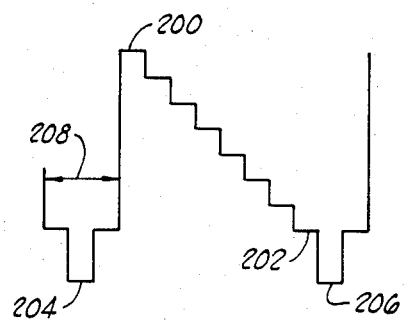
FIG. 2
FIG. 5
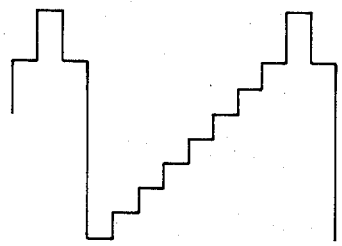
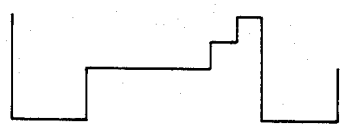
FIG. 3
FIG. 6
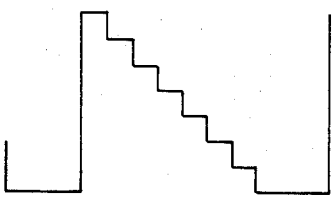
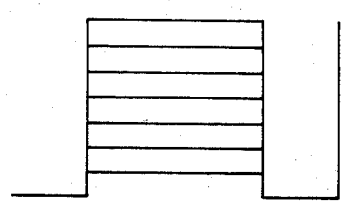
FIG. 4
FIG. 7

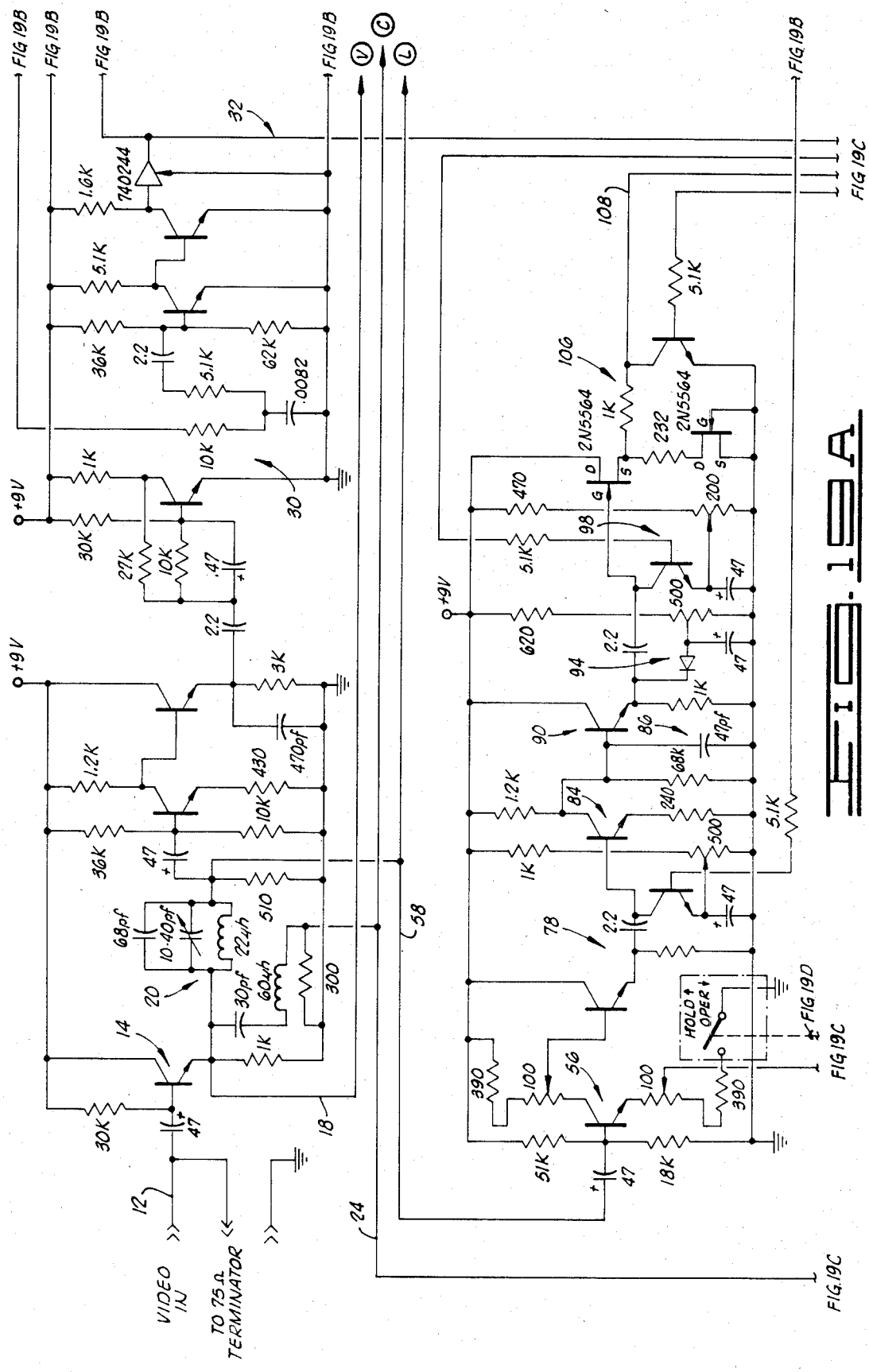

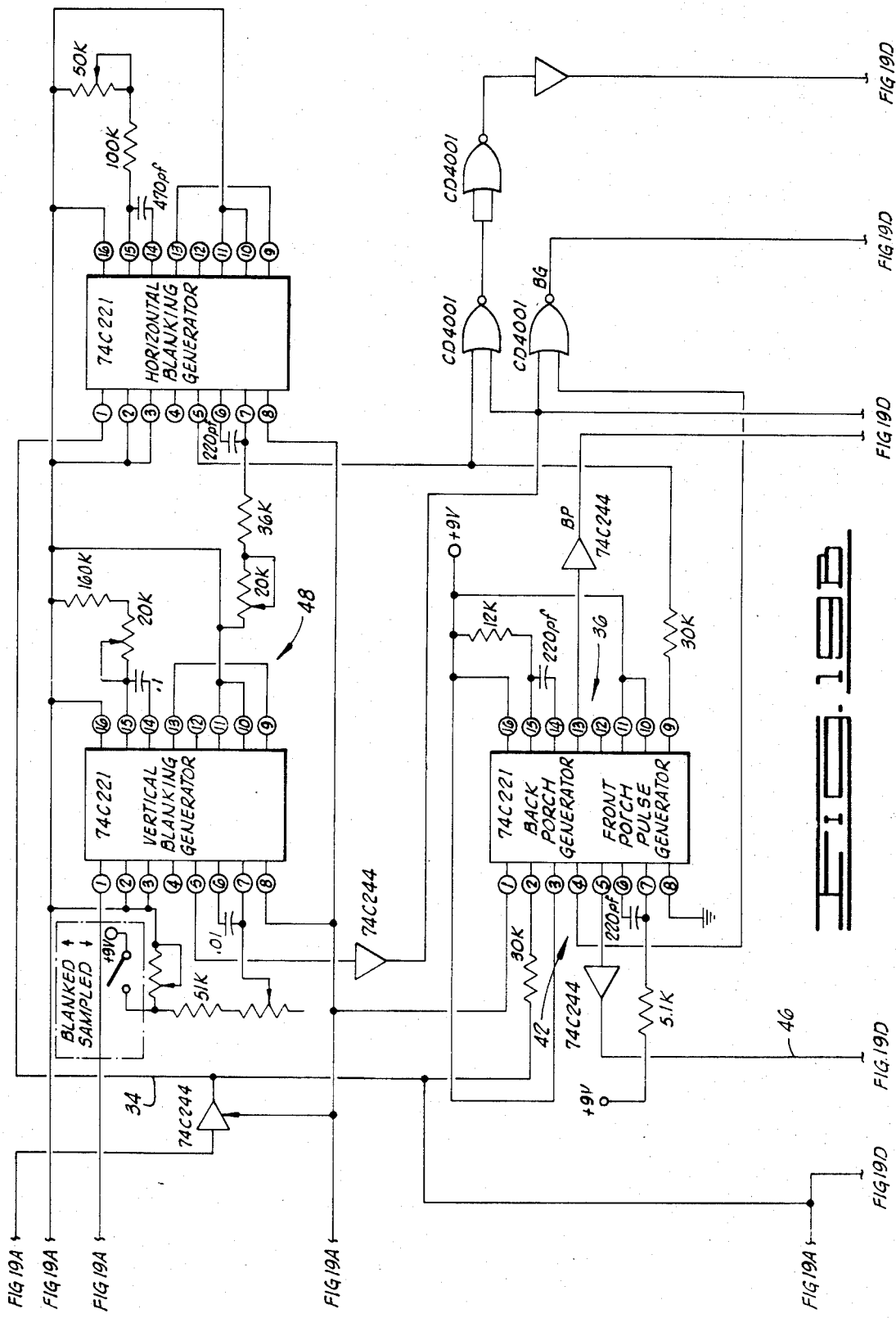

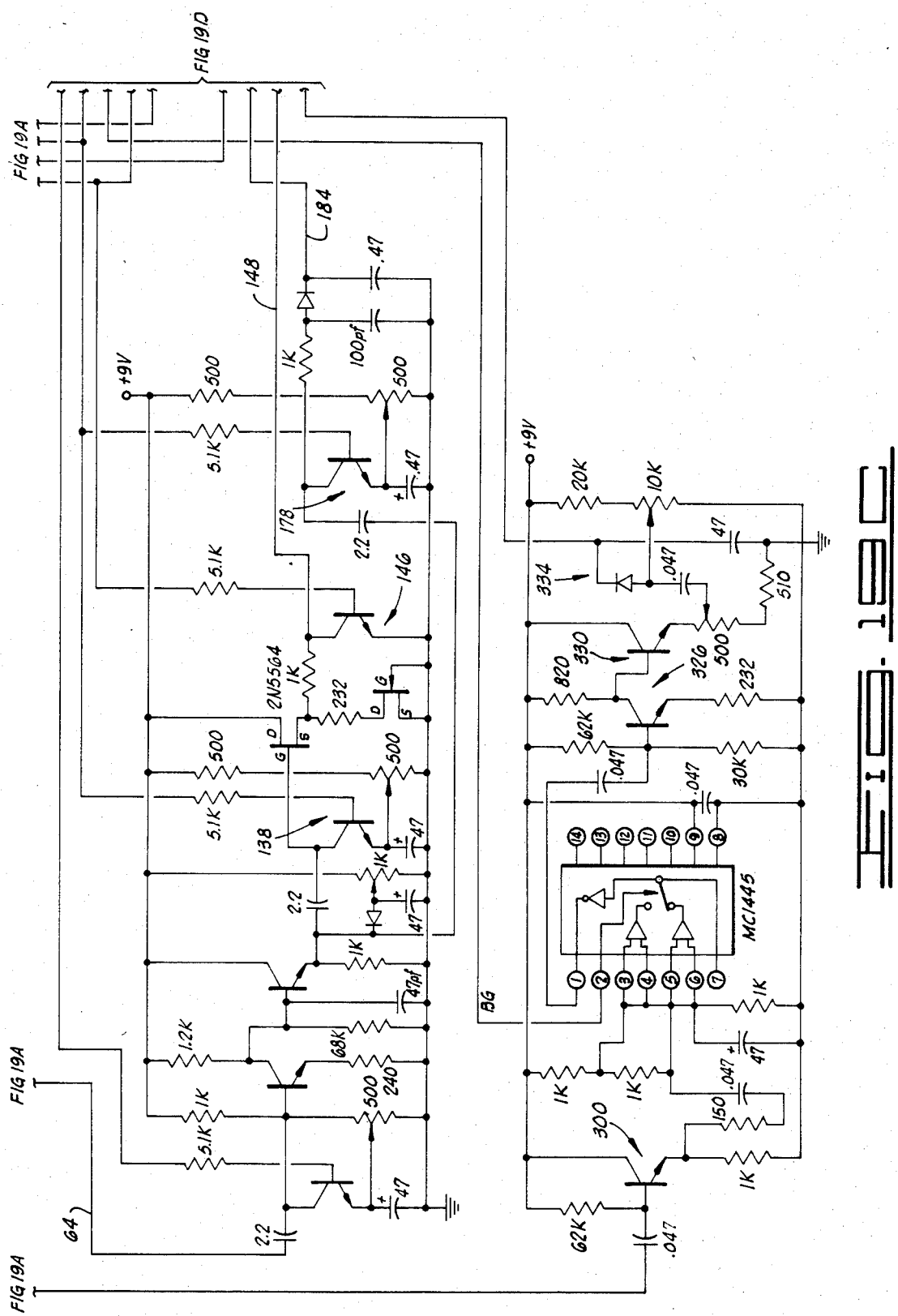

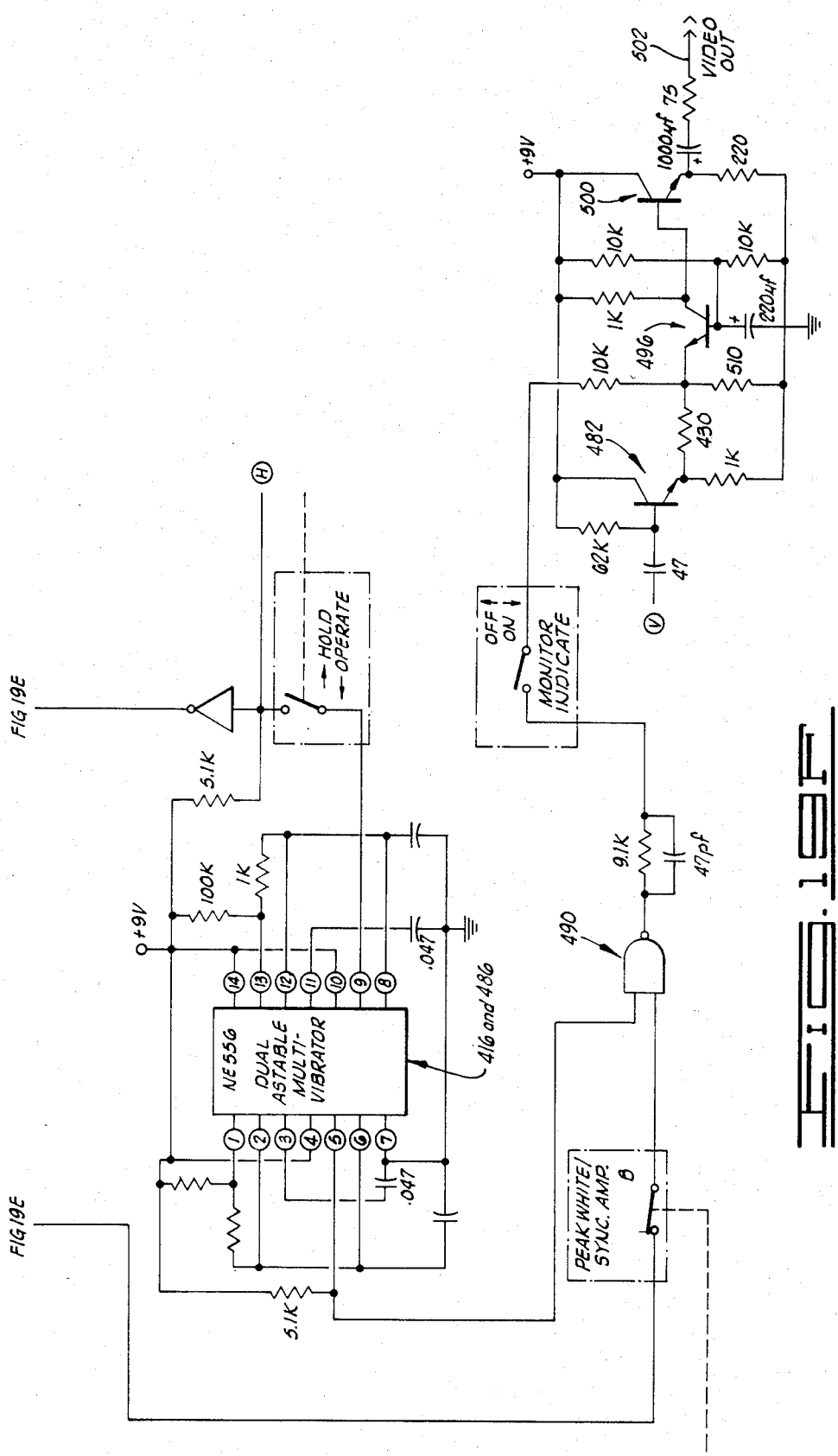

SYSTEM FOR MONITORING VIDEO SIGNAL PARAMETERS, INCLUDING THE LUMINANCE SIGNAL

BACKGROUND OF THE INVENTION

The present invention relates generally to systems for monitoring various parameters of a video signal and, more particularly, to a system for monitoring the luminance signal and providing an output indication indicating the comparison of the luminance signal to reference value, preferably in digital form.

BRIEF DESCRIPTION OF THE DRAWINGS

FIG. 2 is a diagrammatic representation of a noninverted luminance signal separated from a video signal.

FIG. 3 is a diagrammatic representation of an inverted luminance signal.

FIG. 4 is a diagrammatic representation of a noninverted luminance signal with the sync signal portion clipped therefrom.

FIG. 5 is a diagrammatic representation of an inverted luminance signal with the grey and white portion clipped therefrom, thereby leaving the negative peak (black luminance signal) and the sync signal peaks.

FIG. 6 is a diagrammatic representation of a signal appearing on a signal path after the blanking stage in the peak black level processing network of the monitoring system of the present invention shown in FIGS. 1A and 1B (the black luminance signal).

FIG. 7 is a diagrammatic representation of the signal appearing after the blanking stage in the peak white level processing network shown at a vertical rate of the monitoring system of the present invention (the white luminance signal).

FIGS. 19A through 19F are schematic views of one monitoring system which is constructed in accordance with the present invention.

DESCRIPTION OF THE PREFERRED EMBODIMENT

Figure 1A:
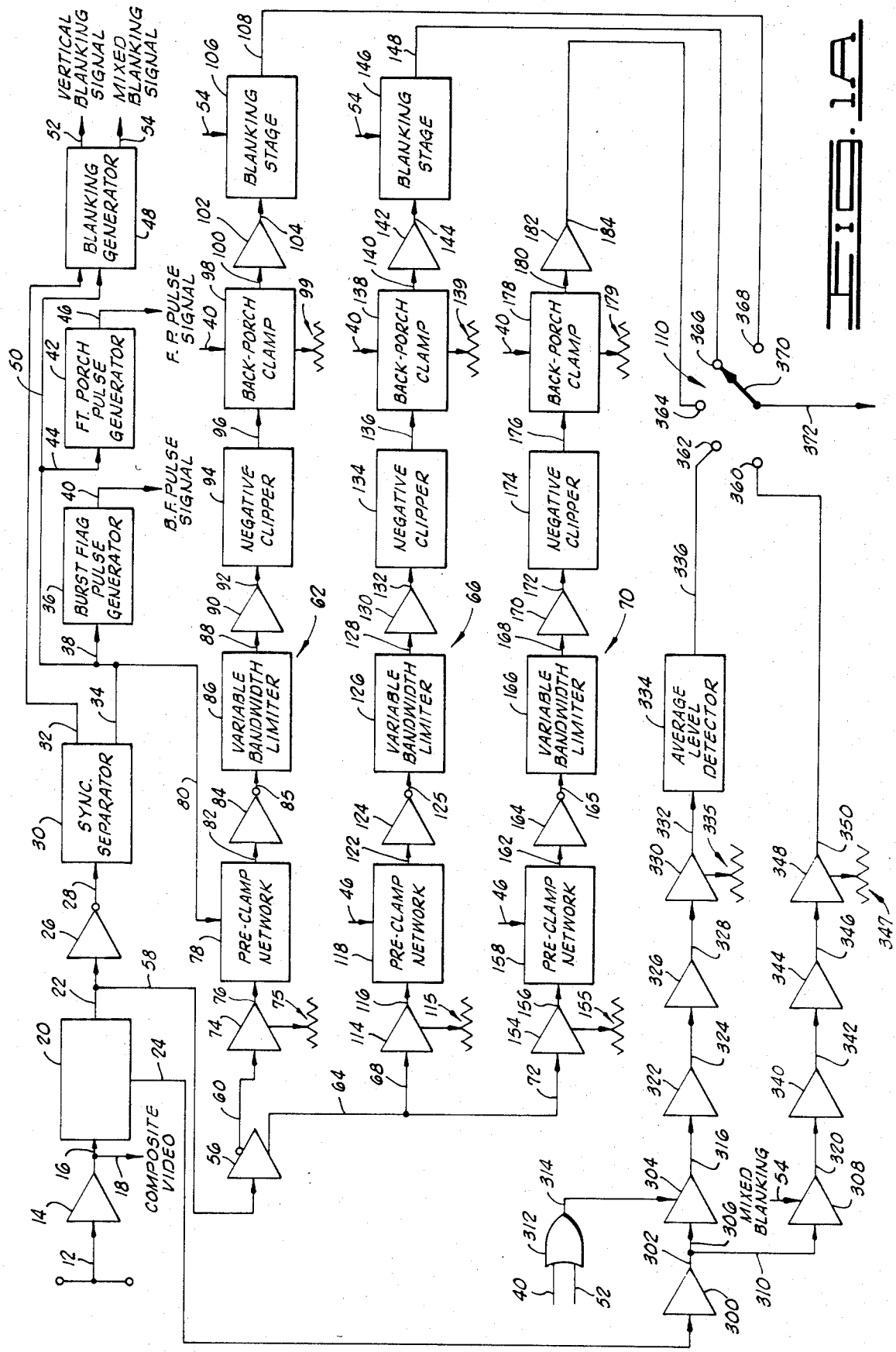
FIGS. 1A and 1B are a diagrammatic, schematic view of a monitoring system which is constructed in accordance with the present invention.

When a video signal is to be transmitted or recorded on tape, various video signal parameters or simply video parameters are commonly monitored in an effort to assure the quality of the transmitted or recorded video signal meets certain known standards. One of the video parameters which has been monitored is the luminance signal which is an indicator of the black and white picture information in a video signal. When transmitting or recording, the luminance signal generally is monitored in an effort to maintain the peak to peak voltage of the luminance signal at a predetermined value. The monitoring system of the present invention provides a system for monitoring the luminance signal, among other video parameters, and for providing a visually or audibly perceivable output indication of the monitored, detected luminance signal. In a preferred embodiment, values of the monitored luminance signal are compared with a reference value and a visually or audibly perceivable output indication is provided indicating the comparison of the predetermined values of the monitored luminance signal to the reference value. Utilizing this outputted visually or audibly perceivable output indication, the monitored luminance signal can be adjusted until the outputted comparison is within a predetermined tolerance. Preferably, the outputted comparison is in a digital percentage form.

It should be noted that the luminance signal includes negative black luminance peaks which contain black picture information and positive white luminance peaks which contain white picture information. Thus, in a preferred embodiment, the positive white luminance peak voltage of the monitored luminance signal is compared with a reference value and a perceivable output indication is provided of such comparison, and the negative black luminance peak voltage of the monitored luminance signal is compared with a reference value and a perceivable output indication is provided of such comparison. In an operable embodiment, the reference values relating to the positive and negative white and black luminance peaks of the monitored luminance signals are each a DC voltage level corresponding to IRE units or a percentage of peak video and the output indications are in percentages or IRE units. Thus, if the output indication indicates the comparison of the positive white luminance peak voltage of the monitored luminance signal is 96 percent, for example, the operator can adjust such luminance value or, in other words, the gain until the output indications indicate a value of 100 percent.

The composite video signal comprises picture signals, synchronizing and blanking signals, luminance signals and color picture information signals, the color information signals comprising chrominance signals and color burst signals. As mentioned before, the luminance signal comprises positive white luminance peaks and negative black luminance peaks. The synchronizing and blanking signals comprise vertical and horizontal blanking signals and vertical and horizontal synchronizing signals. It should be noted that the monitoring system of the present invention also is useful in monitoring selected video parameters of the video signal rather than the composite video signal, the video signal not including the synchronizing signals.

Figure 1B:
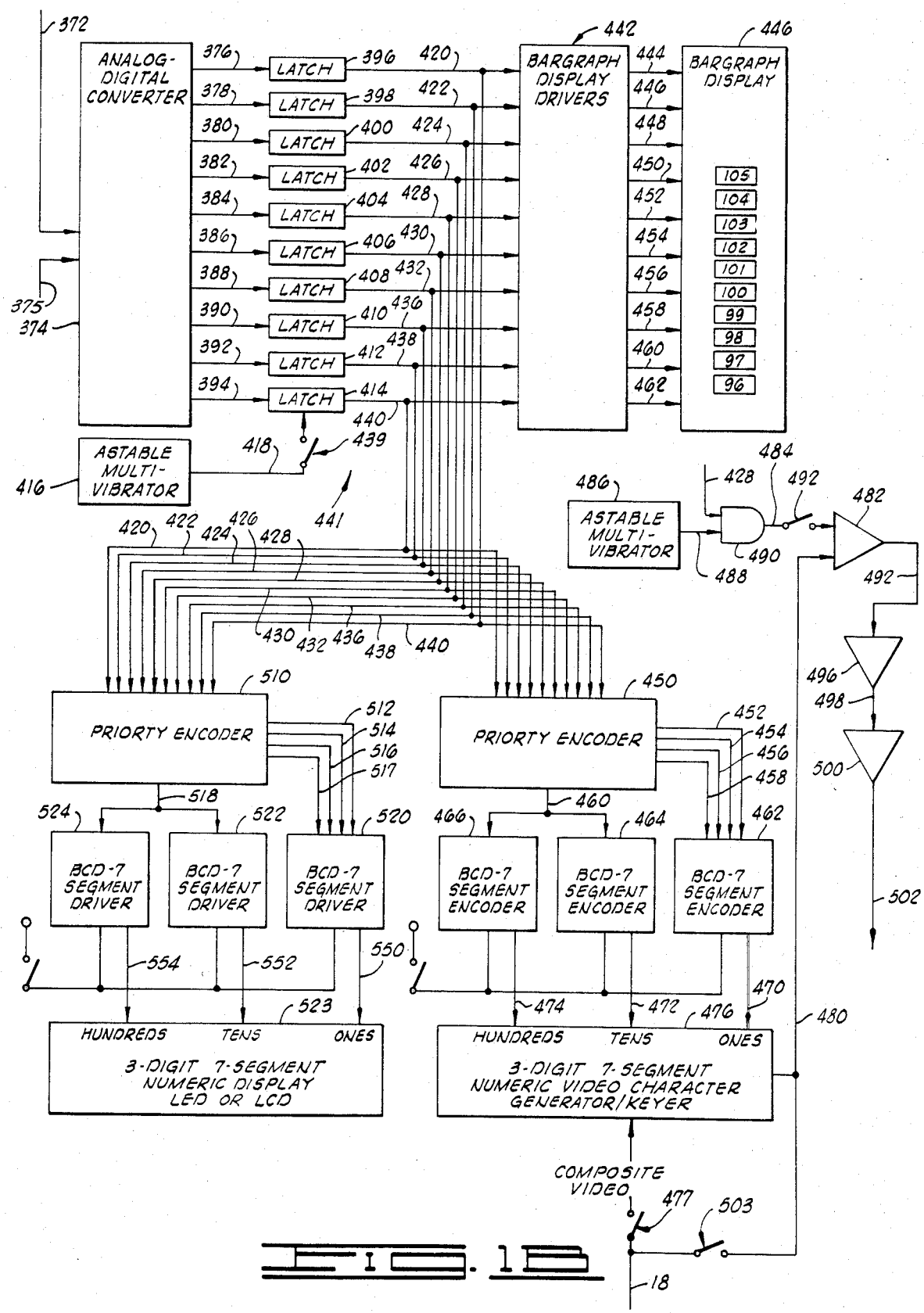

Shown in FIGS. 1A and 1B is a monitoring system which is constructed in accordance with the present invention for monitoring certain video parameters of a composite video signal. Referring to FIG. 1A, the composite video signal to be monitored is inputted into the monitoring system of the present invention via an input line 12 which is connected to a buffer amplifier 14, the buffer amplifier 14 receiving the composite video signal and providing the buffered composite video signal on an output signal path 16. The buffered composite video signal also is provided on a signal path 18 which is connected to the signal path 16, the buffered composite video signal being provided on the signal path 18 which is utilized in the display in a manner to be described in greater detail below. In a preferred form, the input to the buffer amplifier 14 is a looping type, high impedance input. In one operable embodiment and with the transmission line 12 terminated at 75 ohms, the buffered composite video signal on the signal path 16 measures 1.0 volt peak to peak.

The buffered composite video signal is connected to and received by a chroma-luma separator 20 (a chrominance-luminance separator). The chroma-luma separator 20 functions to separate the luminance signals from the chrominance signals in the composite video signals received by the chroma-luma separator 20, the chroma-luma separator 20 providing the luminance signals on an output signal path 22 and providing the chrominance signals on an output signal path 24. The chroma-luma separator 20 utilizes LC filter techniques to separate the 3.58 Mhz component (chrominance signals) from the composite video signal.

The luminance signals on the signal path 22 are connected to and received by an inverting amplifier 26. In one preferred embodiment, the inverting amplifier 26 is constructed to provide a gain of three times the inputted signals. The inverting amplifier 26 inverts and amplifies the received luminance signals and provides the inverted, amplified luminance signals on an output signal path 28.

The inverted, amplified luminance signals are received by a synchronization separator 30 ("sync separator" in FIG. 1A). The synchronization separator 30 functions to separate the mixed synchronizing signals from the luminance signals (video signal) and the sync separator 30 also functions to separate the vertical synchronizing signal from the mixed synchronizing signal (vertical and horizontal synchronizing signals). The sync separator 30 provides the vertical synchronizing signal on an output signal path 32 and the sync separator 30 functions to provide the mixed synchronizing signals on an output signal path 34. The sync separator 30 outputs provided on the signal paths 32 and 34 each are digital pulsed outputs in proper timing with respect to the signal component portions on the inputted signal on the signal path 28.

The mixed synchronizing signals from the sync separator 30 are connected to and received by a burst flag pulse generator 36 via a signal path 38. The burst flag pulse generator 36 is constructed to sense and detect the timing and phase of the horizontal synchronizing signal and to generate a burst flag pulse that will start about 5.5 microseconds after the start of the horizontal synchronizing signal and the burst flag pulse will last about 2.8 microseconds, thus, the burst flag pulse generator 36 provides a burst flag pulse signal output having pulses in proper timing and phase to coincide with the burst signal. The burst flag pulse signal generated by the burst flag pulse generator 36 is provided on an output signal path 40, such output being designated in FIG. 1A as the "B.F. Pulse Signal".

The mixed synchronizing signal also is connected to and received by a front porch pulse generator 42 on a signal path 44, the signal path 44 being connected to the signal path 34. The front porch generator 42 is constructed and adapted to sense and detect the front porch portion of the horizontal blanking signal and to provide an output front porch pulse signal on a signal path 46 in response to receiving and detecting the front porch portions of the horizontal blanking signal received on the signal path 44. The front porch pulse signal provided on the signal path 46 by the front porch pulse generator 42 is in proper timing and phase to coincide with the front porch portion of the horizontal blanking signal received by the front porch pulse generator 42 on the signal path 44, such output being designated in FIG. 1A as the "F.P. Pulse Signal".

The mixed synchronizing signal provided by the sync separator 30 also is connected to and received by a blanking generator 48 via a signal path 50, the signal path 50 being connected to the signal path 34. The vertical blanking signal provided by the sync separator 30 on the signal path 32 also is connected to and received by the blanking generator 48. The blanking generator 48 is constructed to sense and detect the timing and phase of the vertical synchronizing signal and to generate a vertical blanking pulse that starts 10 horizontal lines before the start of the vertical synchronizing signal and ends at a point just prior to or just after the vertical interval test signals, such ending point to be selected as desired in a particular application. The vertical blanking signal is outputted on signal path 52, such output signal being designated in FIG. 1A as "Vertical Blanking Signal". The blanking generator 48 also is constructed to sense and detect the timing and phase of the horizontal synchronizing signals and to generate a horizontal blanking pulse that starts 1.5 microseconds before the start of the horizontal synchronizing signal and ends 8.9 microseconds after the beginning of the horizontal synchronizing signal. Also, the vertical blanking generator 48 is constructed and adapted to sense and detect the horizontal and the vertical blanking signals (pulses) and to provide an output mixed blanking signal (horizontal and vertical blanking signals) on a signal path 54 comprising the vertical and the horizontal blanking pulses. The vertical blanking signal is in sync with respect to timing and phase to the vertical blanking pulses in the received input signals and the outputted mixed blanking signal is in sync with the horizontal and vertical blanking pulses in the received inputted signals. Thus, the blanking generator 48 is constructed and adapted to provide one output signal comprising only the vertical blanking signal (pulse) and to provide one other output signal on the signal path 54 comprising the vertical and the horizontal blanking signals (pulses).

It should be noted that the vertical blanking pulses provided on the output signal path 52 by the blanking generator 48 start or are initiated at a point in each field that is just prior to the head switching point of helical video recorders. This is an earlier point in time than normal for vertical blanking to begin but is necessary to blank out the head switching in helical tape recorders. This noise frequently exceeds the normal video amplitude and, if not removed, this noise would give erroneous amplitude measurements. The end of the vertical blanking interval can be switched from a position just prior to the vertical interval test signals to a position just after the vertical interval test signals by a user operated switch. This permits the user to allow the vertical interval test signals to be included in the measured signal or to be blanked out and not measured.

The luminance signal provided by the chroma-luma separator 20 on the signal path 22 is connected to and received by a phase splitter 56 via a signal path 58 which is connected to the output signal path 22 from the chroma-luma separator 20. The phase splitter 56 inverts the received luminance signal and the inverted luminance signal is provided on an output signal path 60 from the phase splitter 56. The inverted luminance signal is connected to and received by a peak white level processing network 62. The non-inverted is provided by the phase splitter 56 on an output signal path 64. The non-inverted luminance signal, is connected to and received by a peak black level processing network 66 via a signal path 68 and by a sync level processing network 70 via a signal path 72.

The peak white level processing network 62 includes an amplifier 74 which is constructed and adapted to receive the inverted output of the phase splitter 56 on the signal path 60 (the inverted luminance signal). The amplifier 74 amplifies the received inverted luminance signal inputted on the signal path 60 and provides an amplified output on a signal path 76. Preferably, the amplifier 74, more particularly, is an AC gain control type amplifier with a calibration adjustment for fine adjustment to trim the calibration of the peak white level processing network 62, such adjustment being indicated at 75 in FIG. 1A.

The amplifier 74 output on the signal path 76 is connected to and received by a preclamp network 78 and the preclamp network 78 also is constructed and adapted to receive the mixed synchronizing signal provided by the sync separator 30 on the signal path 34 via a signal path 80. The preclamp network 78 sync-tip clamps the received signal inputted on the signal path 76 and provides the sync-tip clamped signal on an output signal path 82, the preclamp network 78 functioning to provide DC restoration of the received signal inputted on the signal path 76.

The signal outputted by the preclamp network 78 on the signal path 82 is connected to and received by an amplifier 84. The amplifier 84 is constructed to amplify the received signal inputted on the signal path 82 and to provide an amplified signal on an output signal path 85. In one preferred embodiment, the amplifier 84 is selected and adapted to provide a gain of four times.

The amplified signal on the signal path 85 is connected to and received by a variable band width limiter 86. The variable band width limiter 86 is adapted and constructed to reduce the band width of the received signal inputted on the signal path 84 by an amount predetermined by the passive circuitry in the variable band width limiter 86 and to provide a signal of reduced band width on an output signal path 88. The signal on the signal path 88 is inputted to a buffer amplifier 90 and the buffered output of the buffer amplifier 90 is provided on a signal path 92.

The buffer amplifier 90 output signal on the signal path 92 is received by a negative clipper 94. The negative clipper 94 clips the most negative portion of the signal inputted on the signal path 92 to substantially prevent interference with the final clamp circuit and the clipped signal is provided by the negative clipper 94 on an output signal path 96.

The clipped signal provided by the negative clipper 94 on the signal path 96 is inputted to and received by a back porch clamp 98. The back porch clamp 98 also receives the back porch pulse signal on the signal path 40 and, in a preferred form, the back porch clamp 98 is connected to a variable DC bias indicated at 99 in the drawings. The back porch clamp 98 is a precision keyed clamp which is adapted to maintain an accurate DC reference on the signal inputted to the clamp on the signal path 96 and the back porch clamp provides an output signal on a signal path 100 which is connected to and received by a buffer amplifier 102.

The buffer amplifier 102 output signal is provided on a signal path 104 which is connected to and received by a blanking stage 106, the back porch clamp 98 output signal being DC coupled through the buffer 102 to the blanking stage 106. The blanking stage 106 also is adapted to receive the mixed blanking signal provided by the blanking generator 48 on the signal path 54. In response to receiving the signal on the signal path 104 and the mixed blanking signal on the signal path 54, the blanking stage 106 performs blanking on the received signal inputted on the signal path 104 to remove the synchronizing and blanking signals from the luminance signals to prevent the synchronizing and blanking signals from affecting the readings obtained and the blanking stage output signal then is DC coupled through the blanking stage 106 to provide an output signal on a signal path 108 which is connected to a signal selector switch 110. The output signal on the signal path 108 is the white luminance signal clamped to a DC reference voltage. The peak white level processing network 62 thus sets the luminance back porch at a specified DC level so that the white luminance signal peaks can be compared to that level.

As mentioned before, the non-inverted output provided by the phase splitter 56 on the signal path 64 is connected to and received by the peak black level processing network 66 on a signal path 68. The peak black level processing network 66 is constructed similar to the peak white level processing network 62, described before.

The peak black level processing network 66 includes an amplifier 114 which is constructed and adapted to receive the non-inverted output of the phase splitter 56 on the signal path 68, the black luminance signal. The amplifier 114 amplifies the received black luminance signal inputted on the signal path 68 and provides an amplified output on a signal path 116. Preferably, the amplifier 114, more particularly, is an AC gain control type amplifier with a calibration adjustment for fine adjustment to trim the calibration of the peak black level processing network 66, such calibration being indicated at 115 in FIG. 1A.

The amplifier 114 output on the signal path 116 is connected to and received by a preclamp network 118 and the preclamp network 118 also is constructed and adapted to receive the front porch pulse signal provided by the front porch pulse generator 42 on the signal path 46. The preclamp network 118 front porch clamps the received black luminance signal inputted on the signal path 116 and provides the front porch clamped signal on an output signal path 122, the preclamp network 118 functioning to provide DC restoration of the received signal inputted on the signal path 116.

The signal outputted by the preclamp network 118 on the signal path 122 is connected to and received by an amplifier 124. The amplifier 124 is constructed to amplify the received signal inputted on the signal path 122 and to provide an amplified signal on an output signal path 125. In one preferred embodiment, the amplifier 124 is selected and adapted to provide a gain of four times.

The amplified signal on the signal path 125 is connected to and received by a variable band width limiter 126. The variable band width limiter 126 is adapted and constructed to reduce the band width of the received signal inputted on the signal path 125 by an amount predetermined by the passive circuitry in the variable band width limiter 126 and to provide a signal of reduced band width on an output signal path 128. The signal on the signal path 128 is inputted to a buffer amplifier 130 and the buffered output of the buffer amplifier 130 is provided on a signal path 132.

The buffer amplifier 130 output signal on the signal path 132 is received by a negative clipper 134. The negative clipper 134 clips the most negative portion of the signal inputted on the signal path 132 to substantially prevent interference with the final clamp circuit and the clipped signal is provided by the negative clipper 134 on an output signal path 136.

The clipped signal provided by the negative clipper 134 on the signal path 136 is inputted to and received by a back porch clamp 138. The back porch clamp 138 also receives the burst flag pulse signal on the signal path 40 and, in a preferred form, the back porch clamp 138 is connected to a variable DC bias indicated at 139 in the drawings. The back porch clamp 138 is a precision keyed clamp which is adapted to maintain an accurate DC reference on the signal inputted to the back porch clamp 138 on the signal path 136 and the back porch clamp 138 provides an output signal on a signal path 140 which is connected to and received by a buffer amplifier 142.

The buffer amplifier 142 output signal is provided on a signal path 144 which is connected to and received by a blanking stage 146, the back porch clamp 138 output signal being DC coupled through the buffer 142 to the blanking stage 146. The blanking stage 146 also is adapted to receive the mixed blanking signal provided by the blanking generator 48 on the signal path 54. In response to receiving the signal on the signal path 144 and the mixed blanking signal on the signal path 54, the blanking stage 146 performs blanking on the received signal inputted on the signal path 144 to remove the synchronizing and blanking signals from the luminance signals to prevent the synchronizing and blanking signals from affecting the readings obtained and the blanking stage output signal then is DC coupled through the blanking stage 146 to provide an output signal on a signal path 148 which is connected to the signal selector switch 110. The signal on the signal path 148 is the black luminance signal clamped to a reference DC voltage. The peak black level processing netowrk 66 thus sets the luminance back porch at a specified DC level so that the black luminance peaks can be compared to that level.

Thus, the peak black processing network 66 is constructed similar to the peak white processing network 62, except the preclamp network 118 utilizes the front porch pulse signal on the signal path 46 whereas the preclamp network 78 utilizes the mixed synchronizing signal on the signal path 80, and the DC levels are slightly different. Also, in the peak black processing netowrk 66, the blanking stage 146 must remove all of the sync and blanking components in the received signal which is not necessary with respect to the blanking stage 106 of the peak white processing network 62. The non-inverted output provided by the phase splitter 56 on the signal path 64 also is connected to a sync level processing network 70 via the signal path 72, as mentioned before. The sync level processing network is constructed similar to the peak white level network 62 and the peak black level network 66 described before.

The sync level processing network 70 includes an amplifier 154 which is constructed and adapted to receive the non-inverted output of the phase splitter 56 on the signal path 72. The amplifier 154 amplifies the received signal inputted on the signal path 72 and provides an amplified output on a signal path 156. Preferrably, the amplifier 154, more particularly, is an AC gain control type amplifier with a calibration adjustment for fine adjustment to trim the calibration of the sync level processing network 70, such calibration being indicated at 155 in FIG. 1A.

The amplifier 154 output on the signal path 156 is connected to and received by a preclamp network 158 and the preclamp network 158 also is constructed and adapted to receive the front porch signal provided by the front porch pulse generator 42 on the signal path 46. The preclamp network 158 front porch clamps the received sync signal from signal path 156 and provides the clamped signal on an output signal path 162, the preclamp network 158 functioning to provide DC restoration of the received signal inputted on the signal path 156.

The signal outputted by the preclamp network 158 on the signal path 162 is connected to and received by an amplifier 164. The amplifier 164 is constructed to amplify the received signal inputted on the signal path 162 and to provide an amplified signal on an output signal path 165. In one preferred embodiment, the amplifier 164 is selected and adapted to provide a gain of four times.

The amplified signal on the signal path 165 is connected to and received by a variable band width limiter 166. The variable band width limiter 166 is adapted and constructed to reduce the band width of the received signal inputted on the signal path 165 by an amount predetermined by the passive circuitry in the variable band width limiter 166 and to provide a signal of reduced band width on an output signal path 168. The signal on the signal path 168 is inputted to a buffer amplifier 170 and the buffered output of the buffer amplifier 170 is provided on a signal path 172.

The buffer amplifier 170 output signal on the signal path 172 is received by a negative clipper 174. The negative clipper 174 clips the most negative portion of the signal inputted on the signal path 172 to substantially prevent interference with the final clamp circuit and the clipped signal is provided by the negative clipper 174 on an output signal path 176.

The clipped signal provided by the negative clipper 174 on the signal path 176 is inputted to and received by a back porch clamp 178. The back porch clamp 178 also receives the back porch pulse signal on the signal path 40 and, in a preferred form, the back porch clamp 178 is connected to a variable DC bias as indicated at 179 in FIG. 1A. The back porch clamp 178 is a precision keyed clamp which is adapted to maintain an accurate DC reference on the signal inputted to the clamp on the signal path 176 and the back porch clamp provides an output signal on a signal path 180 which is connected to and received by a buffer amplifier 182. The buffer amplifier 182 output signal is provided on a signal path 184 which is connected to the selector switch 110.

Thus, the sync level processing network 70 is similar to the peak white and the peak black processing networks 62 and 66, except the DC bias levels are slightly different.

In some applications, it may be desirable to interpose a level averaging circuit (not shown) in the signal path 184 which is constructed to receive the synchronizing signal from the buffer 182 and to provide a DC signal output on the signal path 184, the DC signal outputted by the level average circuit is an average DC proportional to the peak to peak voltage of the synchronizing signal. Thus, the sync level processing network to determine the average peak to peak voltage value of the synchronizing signal and the signal on the signal path 184 outputted via the average level detector (not shown in FIG. 1A) is a DC voltage proportional to the average peak to peak voltage value of the synchronizing signal.

The chroma portion of the composite video signal separated by the chroma-luma separator 20 and provided on the signal path 24 is connected to and received by a buffer amplifier 300. The buffered chroma signal is provided by the buffer amplifier 300 on an output signal path 302. The buffered chroma signal on the signal path 302 is connected to an electronic switch 304 via a signal path 306. The buffered chroma signal also is connected to an electronic switch 308 via a signal path 310.

The burst flag signal on the signal path 40 is connected to and received by an OR gate 312 and the OR gate 312 also receives the vertical blanking signal provided on the signal path 52. The OR gate 312 provides an output signal of the burst flag (back porch) pulses that turn on the electronic switch 304 only during the burst interval and, therefore, only passes the color burst signal to the output of the electronic switch 304. The vertical blanking pulses which are supplied to the OR gate 312 on the signal path 52 inhibit the burst flag (back porch) pulses from reaching the OR gate 312 output. Thus, the electronic switch 304 does not pass color burst signals during the vertical blanking interval. This vertical blanking interval is performed because most helical video recorders have a burst of incorrect amplitude during the vertical interval and it becomes necessary to not sample and measure those burst signals.

The electronic switch 308 is constructed to receive the mixed blanking signal on the signal path 54 which turns the electronic switch 308 off during the blanking pulse intervals and only passes chroma during the active part of the video scanline. Therefore, the color burst and various spurious elements are prevented from passing to the output of the electronic switch 308 and are not sampled and measured. The electronic switch output signal is provided on a signal path 320.

The electronic switch 304 output signal provided on the signal path 316 is connected to and received by an amplifier 322 and the amplifier 322 amplifies the received signal, the amplifier 322 providing an amplified signal on an output signal path 324. The amplified signal provided on the output signal path 324 is connected to and received by a buffer amplifier 326 and the buffer amplifier provides a buffered signal on an output signal path 328.

The buffered amplified signal on the signal path 328 is connected to and received by an amplifier 330 which amplifies the received signal and provides an amplified output signal on a signal path 332. The amplified output signal on the signal path 332 is connected to and received by an average level detector 334. In one operable embodiment, the amplifier 322 is adapted to provide an eight times gain for providing the necessary stable signal gain for proper measurement. The burst signal is buffered by the buffer amplifier 326 and the amplifier 330 is adapted for calibration for providing fine adjustment to trim the calibration gain, as indicated at 335 in FIG. 1A. The average level detector 334 is adapted to provide half-wave rectification of the received signal with a resulting DC signal which is proportional to the average amplitude of one-half of the burst envelope, the DC signal output of the average level detector 334 being provided on an output signal path 336 which is connected to and received by the select switch 110. Thus, the average amplitude of the burst signal is determined and the DC voltage value representing the average amplitude of the burst signal is provided on the signal path 336.

The electronic switch 308 output signal provided on the signal path 320 is connected to and received by an amplifier 340 and the amplifier 340 amplifies the received signal, the amplifier 340 providing an amplified signal on an output signal path 342. The amplified signal provided on the output signal path 342 is connected to and received by a buffer amplifier 344 and the buffer amplifier provides a buffered signal on an output signal path 346.

The buffered amplified signal on the signal path 346 is connected to and received by an amplifier 348 which amplifies the received signal and provides an amplified output signal on a signal path 350. In one operable embodiment, the amplifier 340 is adapted to provide an eight times gain for providing the necessary stable signal gain for proper measurement. The signal is buffered by the buffer amplifier 344 and the amplifier 348 is adapted for calibration for providing fine adjustment to trim the calibration gain, as indicated at 347 in FIG. 14. The amplifier 348 output signal on the signal path 350 is connected to and received by the select switch 110. Thus, the output signal on the signal path 350 is the peak to peak voltage value of the chrominance signal centered on ground potential so that the positive peaks can be compared to ground potential of the monitored video signal.

The select switch 110 has five terminals 360, 362, 364, 366 and 368. The peak chroma signal provided by the amplifier 348 on the signal path 350 is connected to the terminal 360 of the selector switch 110; the average burst signal provided by the average level detector 334 on the signal path 336 is connected to the terminal 362 of the select switch 110; the sync level signal provided on the signal path 184 is connected to the terminal 364 of the select switch 110; the black luminance signal provided by the blanking stage 146 on the signal path 148 is connected to the terminal 366 of the select switch 110; and the white luminance signal provided by the blanking stage 106 on the signal path 108 is connected to the terminal 368 of the select switch 110. The select switch 110 includes a switch arm 370 which is connected to a signal path 372 and which is selectively connectable to the terminals 360, 362, 364, 366, and 368, the switch arm 370 more particularly being selectively movable to the terimals 360, 362, 364, 366, 368 and 370 to selectively connect one of the terminals 360, 362, 364, 366, and 368 to a signal path 372.

The select switch 110 is connected to the input of an analog to digital converter 374 (shown in FIG. 1B) via the signal path 372. A reference DC voltage is fed to the analog to digital converter 374 on a signal path 375. The analog to digital converter 374 converts the received analog signal to a digital signal format by comparing the analog signal to the reference DC voltage, and outputting a digital pulse any time the analog signal exceeds the level of the reference DC voltage, the comparison being provided as the analog to digital converter 374 output signal on the signal paths 376, 378, 380, 382, 384, 386, 388, 390, 392 and 394. The digital to analog converter 374 preferably is a precision, high-speed, flash analog to digital type converter which is scaled to measure in proportion to the recognized IRE unit (7.14 millivolts). It should be noted that the resolution of the analog to digital converter 374 can vary depending on the magnitude of the range intended to be measured and an analog to digital converter with the ability to resolve ten levels would measure 10 IRE units while an analog to digital converter with the ability to resolve 100 levels would measure 100 IRE units, for example. Also, it should be noted that other types of analog to digital converters could be utilized in the present invention, if desired in a particular application.

The analog to digital converter 374 provides ten output signals on signal paths 376, 378, 380, 382, 384, 386, 388, 390, 392 and 394, with one of the output signals being provided on each of the signal paths 376, 378, 380, 382, 384, 386, 388, 390, 392 and 394. Each of the signal paths 376, 378, 380, 382, 384, 386, 388, 390, 392 and 394 is connected to one latch 396, 398, 400, 402, 404, 406, 408, 410, 412 and 414. Each latch 396, 398, 400, 402, 404, 406, 408, 410, 412 and 414 is constructed to store the received signal provided on the signal path 376, 378, 380, 382, 384, 386, 388, 390, 392 and 394 connected thereto. An astable multi-vibrator 416 provides an output signal on a signal path 418 and the output signal provided by the astable multi-vibrator 416 is connected to each of the latches 396, 398, 400, 402, 404, 406, 408, 410, 412 and 414 (for clarity, the signal path 418 is shown in FIG. 1B connected only to the latch 414). The latches 396, 398, 400, 402, 404, 406, 408, 410, 412 and 414 each are constructed to hold and provide the received signal on a respective latch output signal path 420, 422, 424, 426, 428, 430, 432, 436, 438, and 440 until cleared by the astable multi-vibrator 416 output signal on the signal path 418. Thus, the astable multi-vibrator 416 functions to periodically clear or reset the latches 396, 398, 400, 402, 404, 406, 408, 410, 412 and 414 by providing a pulse on the astable multi-vibrator 416 output signal path 418. The latches 396, 398, 400, 402, 404, 406, 408, 410, 412 and 414 perform a peak-hold function digitally by holding the highest levels reached by the signal selected by the selector switch 110 until reset by a pulse received on the signal path 418 by the astable multi-vibrator 416.

In one preferred embodiment, a switch 439 is interposed in the signal path 418 generally between the multi-vibrator 416 and the latches 396, 398, 400, 402, 404, 406, 408, 410, 412 and 414. Also, in one embodiment, the astable multi-vibrator 416 is adapted to change state about every one-fourth of a second, and the latches 396, 398, 400, 402, 404, 406, 408, 410, 412 and 414 cooperate with the multivibrator 416 to hold the reading for a period of time sufficient to give an individual's eye enough time to read the displayed numeral. If during the latch holding period of time, a higher value is fed through the analog to digital converter 374, this higher value will cause the appropriate latch to latch-up and such higher value will be provided to the display 441.

The analog to digital converter 374 output signal provided on the signal paths 420, 422, 424, 426, 428, 430, 432, 436, 438, and 440 are connected to a display 441 which is constructed and adapted to provide a visually perceivable output indication of the output signals provided by the analog to digital converter 374. More particularly, in the embodiment of the invention shown in FIG. 1B, the display 441 includes four different forms of a display, with each display being constructed to provide a visually perceivable output indication. In a particular embodiment, the display 441 may include any one or more of the particular displays shown in FIG. 1B.

The display 441 includes bar graph display drivers 442, which, in one embodiment, comprise current amplifiers. The bar graph display drivers 442 includes ten drivers with each driver being connected to and receiving one of the analog to digital 374 output signals provided on the signal paths 420, 422, 424, 426, 428, 430, 432, 436, 438, and 440. The bar graph drivers 442 provides ten output signals on signal paths 444, 446, 448, 450, 452, 454, 456, 458, 460, and 462, each driver providing an output signal on one of the signal paths 444, 446, 448, 450, 452, 454, 456, 458, 460, and 462. The bar graph drivers 442 output signals provided on the signal paths 444, 446, 448, 450, 452, 454, 456, 458, 460, and 462 are connected to and received by a bar graph display 446. The bar graph display includes ten different displays with each display being driven by one of the signals provided on one of the signal paths 444, 446, 448, 450, 452, 454, 456, 458, 460, and 462 provide a visually perceivable bar graph type display output.

In one embodiment, the bar graph display 446 outputs are illustrated in FIG. 1B by the numbers 96, 97, 98, 99, 100, 101, 102, 103, 104 and 105 in the bar graph display 446. In another embodiment, the analog to digital converter 374 can be constructed to provide a display over a wider window or range and, in a particular embodiment, the analog to digital converter 374 and the bar graph display 446 were constructed to provide ten outputs: 69, 85, 93, 97, 99, 100, 101, 102, 107 and 115, for example, which provides a logarithmic type of display with the displayed numerals being closer near the 100 percent value since accuracy becomes a mere important consideration as the 100 percent value is approached. The bar graph drivers 442 comprise the circuitry necessary for driving the particular bar graph display 446 selected in a particular application, such as LED, LCD or VFD type readouts, for example.

The display 441 also includes a priority encoder 450. Each of the analog to digital converter 374 output signals provided on the signal paths 420, 422, 424, 426, 428, 430, 432, 436, 438, and 440 are connected to and received by the priority encoder 450. The priority encoder 450 converts the parallel binary data received from the analog to digital converter 374 on the signal paths 420, 422, 424, 426, 428, 430, 432, 436, 438, and 440 into BCD data which is provided by the priority encoder 450 on output signal paths 452, 454, 456, 458, and 460, the output signal paths 452, 454, 456, 458, and 460 being connected to BCD to seven segment encoders 462, 464 and 466. More particularly, the signal paths 452, 454, 456 and 458 each are connected to the BCD to seven segment encoder 462 and the signal path 460 is connected to the BCD to seven segment encoders 464 and 466. Preferably, the BCD to seven segment encoders 462, 464 and 466 each include a latch which permits each of the encoders 462, 464 and 466 to hold any reading obtained on the input signal paths 452, 454, 456, 458 and 460.

The encoder 462 provides an encoded output signal on the signal path 470, the encoder 464 provides an output signal on the signal path 472 and the encoder 466 provides an output signal on the signal path 474, each of the signal paths 470, 472 and 474 being connected to a three digit, seven segment numeric video character generator and keyer 476. The encoder 462 output signal on the signal path 470 is encoded and inputted into the three digit seven segment numeric video character generator and keyer 476 in the ones position of the number to be displayed; the encoder output signal on the signal path 472 is encoded and inputted into the three digit seven segment numeric video character generator and keyer 476 in the tens position of the number to be displayed; and the encoder 466 output signal on the signal path 474 is encoded and inputted into the three digit seven segment numeric video character generator and keyer 476 in the hundreds position of the number to be displayed.

The three digit seven segment numeric video character generator and keyer 476 also is adapted to receive the monitored composite video signal on the signal path 18 in the closed position of a switch 477 which is interposed in the signal path 18. The character generator and keyer 476 also are adapted to encode the three digit number represented by the encoded signal received on the signal paths 470, 472 and 474 and to provide the encoded composite video signal on an output signal path 480, the three digit seven segment numeric video character generator and keyer 476 being constructed and adapted to encode the numeral into the received composite video signal so the numeral represented by the received encoded signals on the signal paths 470, 472 and 474 is numerically displayed on the outputted encoded composite video signal on the signal path 480. In this manner, rather than displaying the number, the number is displayed directly into the video signal for visually perceivable display on conventional picture monitors. Thus, with respect to the display outputted by the three digit seven segment numeric video character generator and keyer 476, the three digit numeric readout is provided directly on the monitor screen.

The composite video signal provided on the signal path 480 is connected to and received by a mixer 482. The mixer 482 also receives a signal on a signal path 484. The output of an astable multi-vibrator 486 provided on a signal path 488 is connected to and received by an AND gate 490 and the AND gate 490 also receives the signal on the signal path 428 which is one of the outputs outputted by the analog to digital converter 374. The analog to digital output signal provided on the signal path 428 gates the AND gate 490 so that the astable multi-vibrator 486 output signal 488 is gated through the AND gate 490 and provided on the signal path 484 in the high state of the received signals on the signal paths 428 and 488. A switch 492 is interposed between the AND gate 490 and the mixer 482, the switch 492 having one position for interrupting electrical continuity between the AND gate 490 and the mixer 482 and one other position for establishing electrical continuity between the AND gate 490 and the mixer 482.

The mixer 482 output signal is provided on a signal path 494 which is connected to and received by an amplifier 496. The amplifier 496, in one embodiment, is constructed to provide a two times gain and the amplified signal provided by the amplifier 496 is provided on an output signal path 498. The amplifier 496 output signal on the signal path 498 is connected to and received by a driver 500 and the driver 500 output signal is provided on a signal path 502 which is connected to a video monitor (not shown).

In the open position of the switch 492, the mixer 482 receives the encoded composite video on the signal path 480, and this encoded composite video is amplified by the amplifier 496 and provided by the driver 500 on the signal path 502 for reception by a video monitor. In one other mode of operation, the switch 477 is opened and a switch 503 is closed thereby directly connecting the composite video signal to the signal path 480 and bypassing the generator and keyer 476. In this mode of operation, the switch 492 is closed, thereby connecting the multivibrator 486 to the input of the mixer 482 via the AND gate 490. When the signal on the signal path 428 is high, the multivibrator 486 output signal is passed through the AND gate 490 to the mixer 482. Thus, when the signal on signal path 428 is high, the mixer 482 receives the composite video signal and the astable multivibrator 486 oscillating output signal and the mixer 482 functions to mix the pulses provided by the astable multivibrator 486 with the picture of the composite video signal and this causes the white portion of the picture to flash in and out or strobe. The strobing or pulsing picture of the composite video signal is passed to the signal path 502 and to the monitor (not shown). The strobing or pulsing picture displayed by the monitor proivdes a visually perceivable output indication that the monitored signal parameter is high since the signal path 428 corresponds to a value of "103" in the embodiment shown in FIG. 1B and the operator then can adjust the selected parameter until the strobing or pulsing ceases. In this last described embodiment, the output indication thus is provided when the selected parameter exceeds or is equal to a predetermined minimum value, the value represented by the signal on the signal path 428 in the embodiment shown in FIG. 1B, for example.

The display 440 also includes a priority encoder 510. Each of the analog to digital converter 374 output signals provided on the signal paths 420, 422, 424, 426, 428, 430, 432, 436, 438, and 440 are connected to and received by the priority encoder 510. The priority encoder 510 converts the parallel binary data received from the analog to digital converter 374 on the signal paths 420, 422, 424, 426, 428, 430, 432, 436, 438, and 440 into BCD data which is provided by the priority encoder 510 on output signal paths 512, 514, 516, 517 and 518, the signal paths 512, 514, 516, 517, and 518 being connected to BCD to seven segment encoders 520, 522 and 524. More particularly, the signal paths 512, 514, 516, and 517 each are connected to the BCD to seven segment encoder 520 and the signal path 518 is connected to the BCD to seven segment encoders 522 and 524. Preferably, the BCD to seven segment encoders 520, 522 and 524 each include a latch which permits each of the encoders 520, 522 and 524 to hold any reading obtained on the input signal paths 512, 514, 516, 517 and 518. The encoder 520 provides an encoded output signal on the signal path 550, the encoder 522 provides an output signal on the signal path 552 and the encoder 524 provides an output signal on the signal path 554, each of the signal paths 550, 552 and 554 being connected to a three digit, seven segment numeric display 523. The encoder 520 output signal on the signal path 550 is encoded and inputted into the three digit seven segment display 523 in the ones position of the number to be displayed; the encoder 522 output signal on the signal path 552 is encoded and inputted into the three digit seven segment numeric display 523 in the tens position of the number to be displayed; and the encoder 524 output signal on the signal path 554 is encoded and inputted into the three digit seven segment numeric display 523 in the hundreds position of the number to be displayed.

In operation, the composite video signal to be monitored is received by the monitoring system of the present invention and intially the chromanance signal is separated from the luminance signal by the chroma luminance separator 20. The luminance signal is inverted by the phase splitter 56 and provided on the signal path 60 for processing by the peak white level processing network 62. The white luminance signal (the positive peaks in the luminance signal) floats and thus the peak white level processing network 62 clamps the white luminance signal to a reference DC voltage and the processed, clamped white luminance signal is provided on the output signal path 108. When the switch arm 370 of the switch 110 is positioned to connect the terminal 368 to the signal path 372, the processed, clamped white luminance signal is passed through the switch 110 to the analog to digital converter 374. The analog to digital converter 374 receives the clamped white luminance signal and compares this to a known, predetermined reference DC voltage level. The comparison performed by the analog to digital converter 374 provides a percentage value indicating the comparison of the monitored white luminance signal with the reference DC voltage level and, in accordance with the determined percentage made by the analog to digital converter 374, the analog to digital converter 374 provides an output signal on at least one of the signal paths 376, 378, 380, 382, 384, 386, 388, 390, 392, or 394 indicative of the determined percentage. The signal outputted by the analog to digital converter 374 is received by the bar graph display drivers 442 and the bar graph display drivers 442 function to drive the bar graph display 446 so that the appropriate display is illuminated or otherwise made visually perceivable. For example, if the analog to digital converter 374 determined the percentage comparison of the white luminance signal with the reference DC voltage level was "102" percent, the analog to digital converter 374 would provide an output signal in a digital form on the signal path 382 which would be received by the bar graph display drivers 442 causing an output signal on the signal path 450 for driving the appropriate bar graph display to illuminate or otherwise make visually perceivable the display indicating "102".

The output of the analog to digital converter 374 also is connected to the priority encoder 450 which converts the digital percentage received from the analog to digital converter 374 to BCD and the BCD form of the signal is connected to the encoders 462, 464, and 466 for driving the numeric video character generator keyer 476. The numeric video character generator keyer 476 encodes the numeric percentage into the composite video signal received on the signal path 18 and the encoded video signal then is made available on the signal path 502 for display on a video monitor. With respect to this particular display and assuming the analog to digital converter had determined the comparison of the white luminance signal with the reference DC voltage level to be "102" percent, the priority encoder 450 and the encoders 462, 464, and 466 would function to cause the numeric video character generator keyer 476 to encode the numeral "102" at a predetermined position in the received composite video and, in this instance, the encoded composite video on the signal path 502 would then be available for display on a video monitor, the picture displayed on the video monitor including the numeral "102" which was encoded therein by the numeric video character generator keyer 476.

The comparison of the white luminance signal with the reference DC voltage level value determined by the analog to digital converter 374 also is connected to the priority encoder 510. The priority encoder 510 converts the received comparison to BCD and the drivers 520, 522, and 524 cooperate to drive the numeric display 523 for displaying the received comparison. For example, if the analog to digital converter 374 determined the comparison of the white luminance signal with the DC reference voltage level value to be "102" percent, the encoder 510 and the encoder 520, 522, and 524 would cooperate to drive the numeric display 523 for displaying the numeral "102".

If the switch 477 is opened and the switches 492 and 503 are closed and if the comparison of the white luminance signal with the reference DC voltage level value was "103" or higher, the signal on the signal path 428 would be high thereby causing the AND gate 490 to pass the astable multivibrator 486 output signal by the mixer 482. The mixer 482 would mix the multivibrator 486 output signal with composite video signal thereby causing the picture of the composite video signal to stroke or pulse which provides a visually perceivable output indication that the white luminance signal is high as compared with the reference DC voltage level value.

The display of the present invention also can be utilized to monitor the black luminance signal (negative peaks in the luminance signal), the synchronizing signal, the average amplitude of the burst signal and the peak to peak voltage value of the chroma signal in the composite video to be monitored. The switch arm 370 is selectively moveable to one of the terminals 360, 362, 364, 366, and 368 for selecting which video parameter of the monitored composite video is to be displayed by the monitor system of the present invention.

The black luminance signal (negative peaks in the luminance signal) also floats and thus the black luminance signal is processed by the peak black level processing network 66 to clamp the black luminance signal (negative peaks in the luminance signal) to a predetermined reference DC voltage level, the processed clamped black luminance signal being provided on the signal path 148. When the switch arm 370 is moved to the terminal 366, as shown in FIG. 1A, the black luminance signal is connected to the analog to digital converter 374.

The analog to digital converter 374 compares the measured voltage level of the negative peaks in the luminance signal (the black luminance signal) to a known, predetermined reference DC voltage level. The comparison performed by the analog to digital converter 374 provides a percentage value indicating the comparison of the black luminance signal with the reference DC voltage level and, in accordance with the determined percentage made by the analog to digital converter 374, the analog to digital converter 374 provides an output signal on at least one of the signal paths 376, 378, 380, 382, 386, 388, 390, 392, or 394 indicative of the determined percentage. The signal outputted by the analog to digital converter 374 is received by the bar graph display drivers 442 and the bar graph display drivers 442 function to drive the bar graph display 446 so that the appropriate display is illuminated or otherwise made visually perceivable.

The output of the analog to digital converter 374 also is connected to the priority encoder 450 which converts the analog percentage received from the analog to digital converter to BCD and the BCD form of the signal is connected to the encoders 462, 464, and 466 for driving the numeric video character generator keyer 476. The numeric video character generator keyer 476 encodes the numeric percentage into the composite video signal received on the signal path 18 and the encoded video signal then is made available on the signal path 502 for display on a video monitor.

The comparison of the black luminance signal with the reference DC voltage value determined by the analog to digital converter 374 also is connected to the priority encoder 510. The priority encoder 510 converts the received comparison to BCD and the drivers 520, 522, and 524 cooperate to drive the numeric display 523 for displaying the received comparison.

The comparison of the black luminance signal also is connected to the AND gate 490 via the signal path 428 so the multivibrator 486 can function to strobe or pulse the picture of the composite video signal when such comparison exceeds a predetermined percentage in a manner like that described before with respect to the white luminance signal.

The synchronizing signal is processed through the sync level processing network 70 so that the synchronizing portion of the monitored composite video is clamped to a predetermined reference voltage and the clamped processed synchronizing signal is provided on the signal path 184, a DC voltage level representing the peak to peak voltage value of the synchronizing signal. When the switch arm 370 is moved to the terminal 364, the clamped processed synchronizing signal is connected to the analog to digital converter 374.

The analog to digital converter 374 compares the determined peak to peak voltage value of the synchronizing signal to a known, predetermined reference DC voltage value. The comparison formed by the analog to digital converter 374 provides a percentage value indicating the comparison of the peak to peak voltage value of the synchronizing signal with the reference DC voltage value and, in accordance with the determined percentage made by the analog to digital converter 374, the analog to digital converter 374 provides an output signal on one of the signal paths 376, 378, 380, 382, 386, 388, 390, 392, or 394 indicative of the determined percentage. The signal outputted by the analog to digital converter 374 is received by the bar graph display drivers 442 and the bar graph display drivers 442 function to drive the bar graph display 446 so that the appropriate display is illuminated or otherwise made visually perceivable.

The output of the analog to digital converter 374 relating to the synchronizing signal also is connected to the priority encoder 450 which converts the analog percentage received from the analog to ditial converter to BCD and the BCD form of the signal is connected to the encoders 462, 464, and 466 for driving the numeric video character generator keyer 476. The numeric video character generator keyer 476 encodes the numeric percentage into the composite video signal received on the signal path 18 and the encoded video signal then is made available on the signal path 502 for display on a video monitor.

The comparison of the peak to peak voltage value of the monitored synchronizing signal with the reference DC voltage value determined by the analog to digital converter 374 also is connected to the priority encoder 510. The priority encoder 510 converts the received comparison to BCD and the drivers 520, 522, and 524 cooperate to drive the numeric display 523 for displaying the received comparison.

The comparison of the peak to peak voltage value of the monitored synchronizing signal also is connected to the AND gate 490 via the signal path 428 so the multivibrator 486 can function to strobe or pulse the picture of the monitored composite video signal when such comparison exceeds a predetermined percentage in a manner like that described before with respect to the white luminance signal.

The separated chrominance signal is processed via the monitoring system of the present invention to provide an average amplitude of the burst signal on the signal path 336. When the switch arm 370 is moved to the terminal 362, the average amplitude of the burst signal (a DC voltage value) portion of the monitored composite video is connected to the analog to digital converter.

The analog to digital converter 374 compares the determined average amplitude voltage value of the average burst signal to a known, predetermined reference DC voltage. The comparison performed by the analog to digital converter 374 provides a percentage value indicating the comparison of the average amplitude voltage of the burst signal with the reference DC voltage and, in accordance with the determined percentage made by the analog to digital converter 374, the analog to digital converter 374 provides an output signal on one of the signal paths 376, 378, 380, 382, 386, 388, 390, 392, or 394 indicative of the determined percentage. The signal outputted by the analog to digital converter 374 is received by the bar graph display drivers 442 and the bar graph display 446 so that the appropriate display is illuminated or otherwise made visually perceivable.

The output of the analog to digital converter 374 relating to the average amplitude of the burst signal also is connected to the priority encoder 450 which converts the analog percentage received from the analog to digital converter to BCD and the BCD form of the signal is connected to the encoders 462, 464, and 466 for driving the numeric video character generator keyer 476. The numeric video character generator keyer 476 encodes the numeric percentage into the composite video signal received on the signal path 18 and the encoded video signal then is made available on the signal path 502 for display on a video monitor.

The comparison of the average amplitude of the burst signal with the reference DC voltage value determined by the analog to digital converter 374 also is connected to the priority encoder 510. The priority encoder 510 converts the received comparison to BCD and the drivers 520, 522, and 524 cooperate to drive the numeric display 523 for displaying the received comparison.

The comparison of the average amplitude of the burst signal with the reference DC voltage value also is connected to the AND gate 490 so the multivibrator 486 can function to strobe or pulse the picture of the monitored composite video signal when such comparison exceeds a predetermined percentage in a manner like that described before with respect to the white luminance signal.

The separated chrominance signal portion of the monitored composite video also is processed by the monitoring system of the present invention to provide the peak chrominance signal (the peak to peak voltage value of the chrominance signal) on the signal path 350. When the switch arm 370 is moved to the terminal 360, the peak chrominance signal is connected to the analog to digital converter 374.

The analog to digital converter 374 compares the peak to peak voltage value of the chrominance signal to a known, predetermined reference DC voltage value. The comparison performed by the analog to digital converter 374 provides a percentage value indicating the comparison of the peak to peak voltage value of the chrominance signal with the reference DC voltage value and, in accordance with the determined percentage made by the analog to digital converter 374, the analog to digital converter 374 provides an output signal on one of the signal paths 376, 378, 380, 382, 386, 388, 390, 392, or 394 indicative of the determined percentage. The signal outputted by the analog to digital converter 374 is received by the bar graph display drivers 442 and the bar graph display 446 so that the appropriate display is illuminated or otherwise made visually perceivable.

The output of the analog to digital converter 374 relating to the peak chrominance signal also is connected to the priority encoder 450 which converts the analog percentage received from the analog to digital converter to BCD and the BCD form of the signal is connected to the encoders 462, 464, and 466 for driving the numeric video character generator keyer 476. The numeric video character generator keyer 476 encodes the numeric percentage into the composite video signal received on the signal path 18 and the encoded video signal then is made available on the signal path 502 for display on a video monitor.

The comparison of the peak to peak voltage value of the chrominance signal with the reference DC voltage value determined by the analog to digital converter 374 also is connected to the priority encoder 510. The priority encoder 510 converts the received comparison to BCD and the drivers 520, 522, and 524 cooperate to drive the numeric display 523 for displaying the received comparison.

The comparison of the peak to peak voltage value of the chrominance signal with the reference DC voltage value also is connected to the AND gate 490 so the multivibrator 486 can function to strobe or pulse the picture of the composite video signal when such comparison exceeds a predetermined percentage in a manner like that described before with respect to the white luminance signal.

As generally mentioned before, the analog to digital converter 374 does not have to detect in linear steps (96, 97, 98, 99, 100, 101, 102, 103, 104 and 105 IRE units or percent as shown in FIG. 1B). It is desirable in some instances to arrange the detectors to occur in non-linear steps. For example, a logarithmic pattern is useful where, in the case of peak white and peak chrominance, the detected peak levels would be in steps of: 69, 85, 93, 97, 99, 100, 101, 103, 107 and 115 IRE units or percent. In this last-mentioned example, peak black would be detected in steps of:

−24, −8, 0, 4, 6.5, 7.5 8.5, 11, 15 and 23 IRE units or percent, and peak sync and average burst would be detected in steps of: 9, 25, 33, 37, 39, 40, 41, 43, 47 and 55 IRE units or percent. Other step selections can be made and the total number of steps may be varied as desired in a particular application.

As generally mentioned before, one or more of the analog to digital converter 374 output signals also could be connected to speakers with the appropriate driving networks for providing audible output indications of the determined percentage values, either one audible output signal or multiple audible output signals with tone differentiation, for example.

Shown in FIG. 2 is a diagrammatic representation of a portion of a non-inverted luminance signal which has been separated from a color bar signal or, in other words, with the chrominance signal removed therefrom. The white luminance signal actually comprises the positive peaks in the luminance signal and a positive peak is shown in FIG. 2 and designated therein by the reference numeral 200. The black luminance signal actually comprises the negative peaks in the luminance signal and a negative peak is shown in FIG. 2 and designated therein by the reference numeral 202. The portion of the luminance signal between the positive peak 200 and the negative peak 202 comprises picture information representating shades between black and white. The sync signal is a portion of the luminance signal shown in FIG. 2 and two sync pulses are shown in FIG. 2, the two sync pulses shown in FIG. 2 being designated by the reference numerals 204 and 206. The luminance signal as shown in FIG. 2 represents the signal appearing on the signal paths 22, 58, 64, 68, 72, 85, 116, 156 and 92 in FIG. 1A. With respect to the luminance signal shown in FIG. 2, the blanking time interval is designated therein by the reference numeral 208.

Shown in FIG. 3 is a diagrammatic representation of an inverted luminance signal, the luminance signal shown in FIG. 3 being inverted with respect to the luminance signal shown in FIG. 2. The inverted luminance signal is representated in FIG. 3 represents the signal which appears on the signal paths 60, 76, 82, 125, 165, 132 and 172 in FIG. 1A.

The negative clipper 94 functions to clip the sync pulse portion from the luminance signal and a non-inverted luminance signal with the sync pulses clippped therefrom is diagrammatically shown in FIG. 4. The non-inverted luminance signal with the sync pulses clipped therefrom as shown in FIG. 4 represents the signal appearing on the signal paths 96 and 104 in FIG. 1A.

The negative clippers 134 and 174 also function to clip the negative portions from the inverted luminance signals. Shown in FIG. 5 is a diagrammatic representation of the clipped, remaining portion of the signal appearing on the signal paths 136, 176 and 184.

Shown in FIG. 6 is a diagrammatic representation of the signal appearing on the signal path 148, this being the signal passed from the blanking stage 146.

Shown in FIG. 7 is a diagrammatic representation of the signal appearing on the signal path 108, the signal being passed from the blanking stage 106. This signal is shown at the vertical TV rate, whereas all other diagrammatic representations are shown at the horizontal TV rate.

Figure 8:
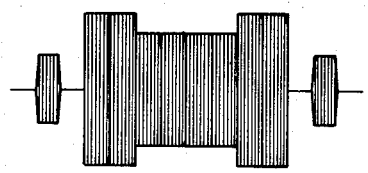
FIG. 8 is a diagrammatic representation of the chrominance signal separated from the video signal with the color burst signals included therein.
Figure 8:
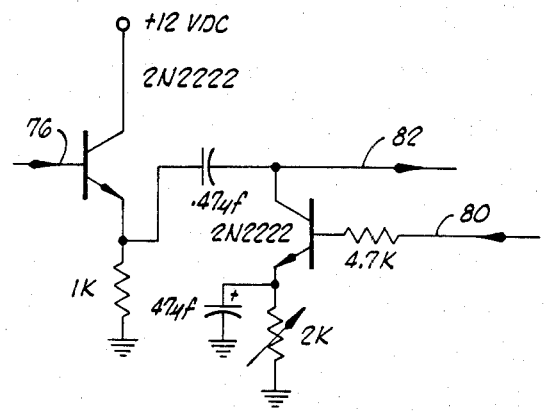
Figure 8:
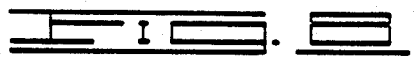

Shown in FIG. 8 is a diagrammatic representation of the chrominance signal or, in other words, the separated chrominance/color burst signal appearing on the signal path 24, the signal being passed from the chroma luminance separator 20. The signal appearing on the signal path 24 and being diagrammatically represented in FIG. 8 also is the signal appearing on the signal paths 302, 306 and 310. It should be noted that the signal as represented in FIG. 8 actually comprises a plurality of waves within each one of the generally rectangular shaped portions.

Figure 9:
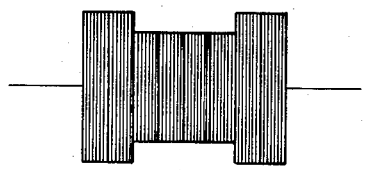
FIG. 9 is a diagrammatic representation of the chrominance signal with the color burst signal blanked therefrom.
Figure 9:
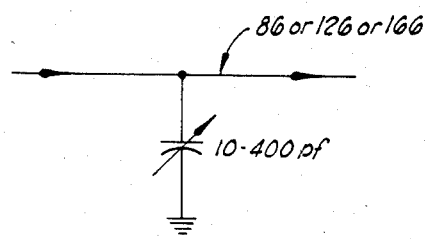
Figure 9:
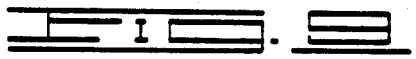

Shown in FIG. 9 is a diagrammatic representation of the separated chrominance signal with the color burst portions of the chrominance signal removed therefrom. The signal represented in FIG. 9 is a representation of the signal appearing on the signal paths 320 and 350 of FIG. 1A. Again, this signal actually comprises a plurality of waves within each of the generally rectangular shapes shown in FIG. 9.

Figure 10:
FIG. 10 is a diagrammatic representation of the chrominance signal with the chroma portion blanked therefrom leaving the color burst signal.
Figure 10:
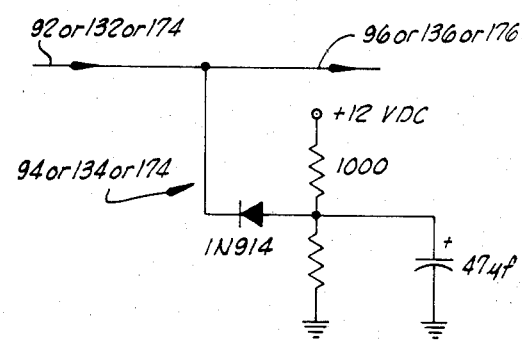
Figure 10:
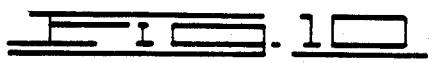

Shown in FIG. 10 is a diagrammatic representation of the chrominance signal with the color burst signal separated therefrom or, in other words, with the chroma portion of the signal blanked therefrom. The signal represented in FIG. 10 represents the signal appearing on the signal paths 316 and 332 in FIG. 1A. Once again, the signal diagrammatically represented in FIG. 10 actually comprises a plurality of waves within each of the shaded rectangular portions of the signal shown in FIG. 10.

Figure 11:
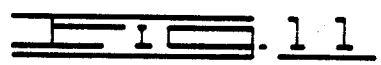
FIG. 11 is a schematic diagram of the preclamp network in the peak white level processing network of the monitoring system of the present invention, the preclamp networks in the peak black level processing network and the sync level processing network in the monitoring system of the present invention being similar in construction.

Shown in FIG. 11 is a schematic representation of the preclamp network 78 in the peak white level processing network 62. The preclamp networks 118 and 158 in the peak black level processing network 66 and the sync level processing network 70, respectively, are identical in construction to the preclamp network 78 shown in FIG. 11, except for the clamp pulse source. Also, the back porch clamps 98, 138 and 178 are constructed identical to the preclamp network 78 shown in FIG. 11, except for the clamp pulse sources, the back porch clamp networks 98, 138 and 178 each having the burst flag or back porch pulse on the signal path 40 as the source of the clamp pulse.

Figure 12:
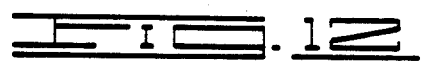
FIG. 12 is a schematic view of a typical variable band width limiter utilized in the processing networks of the monitoring system of the present invention.

Shown in FIG. 12 is a typical variable bandwidth limiter 86, 126 or 166.

Figure 13:
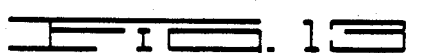
FIG. 13 is a schematic view of a typical negative clipper utilized in the processing networks of the monitoring system of the present invention.

Shown in FIG. 13 is a typical negative clipper 94 or 134 or 174.

Figure 14:
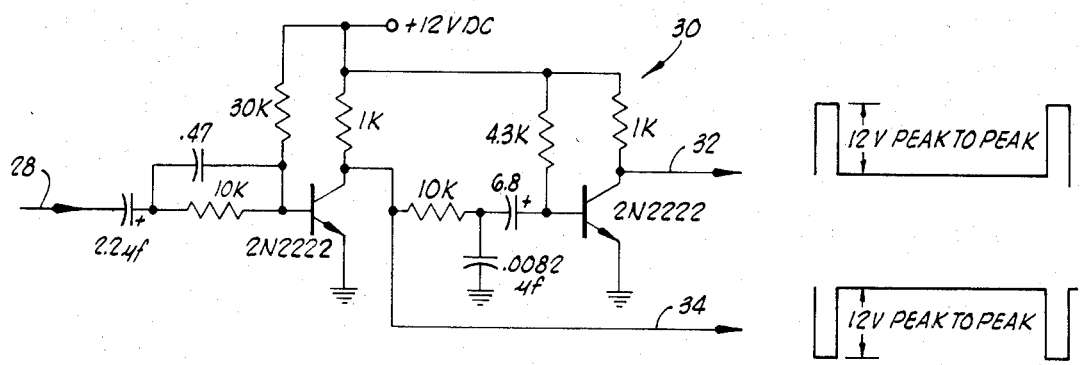
FIG. 14 is a schematic view of a typical sync separator utilized in the monitoring system of the present invention.

Shown in FIG. 14 is a schematic view of the sync separator 30. Also shown in FIG. 14, is a diagrammatic representation of the vertical sync pulse appearing on the signal path 32 passed from the sync separator 30 and a diagrammatic representation of the horizontal sync pulse appearing on the signal path 34 passed from the sync separator 30.

Figures 15, 16:
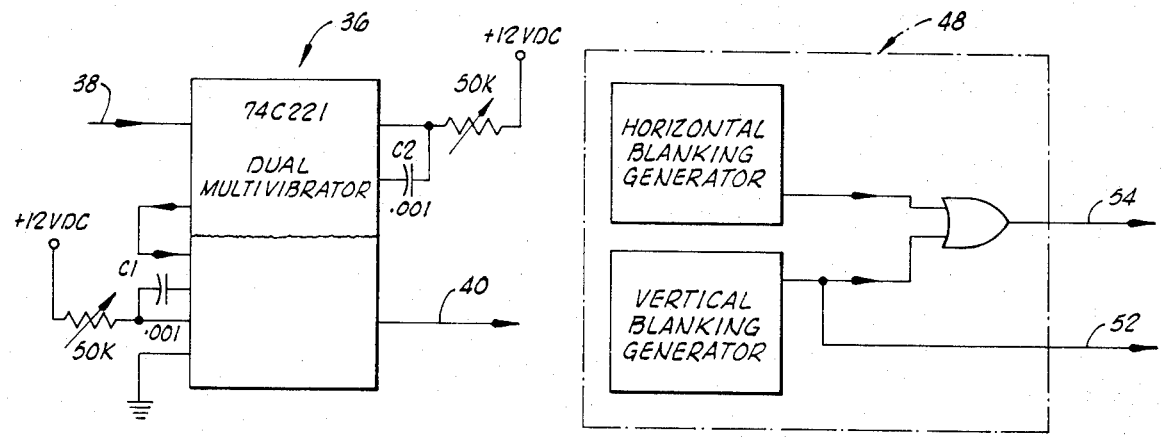
FIG. 15 is a schematic view of the burst flag pulse generator used in the monitoring system of the present invention, the front porch pulse generator being similar in construction.
FIG. 16 is a schematic view of a typical blanking generator used in the monitoring system of the present invention, the horizontal and vertical blanking generators in the blanking generator shown in FIG. 16 being similar in construction to the burst flag pulse generator shown in FIG. 15.

Shown in FIG. 15 is a diagrammatic representation of the burst flag generator 36. The front porch generator 42 is constructed identical to the first flag generator 36 shown in FIG. 15. These networks create or generate a pulse which is in proper timing and phase with the desired signal represented by the output of such networks.

Shown in FIG. 16 is a schematic representation of the blanking generator 48. The horizontal blanking generator shown in FIG. 16 is a portion of the blanking generator 48 is constructed identical to the burst flag pulse generator 36 shown in FIG. 15, except the capacitor designated C2 in FIG. 15 is 0.01 microfarad in the horizontal blanking generator of the blanking generator 48. The vertical blanking generator shown as a portion of the blanking generator 48 in FIG. 18 is identical to the burst flag pulse generator 36 shown in FIG. 15, except the capacitor designated as C1 in FIG. 15 is 0.01 microfarad in the vertical blanking generator of the blanking generator 48 and the capacitor designated C2 in FIG. 15 is 0.1 microfarad with respect to the vertical blanking generator of the blanking generator 48 shown in FIG. 16.

Figures 17, 18:
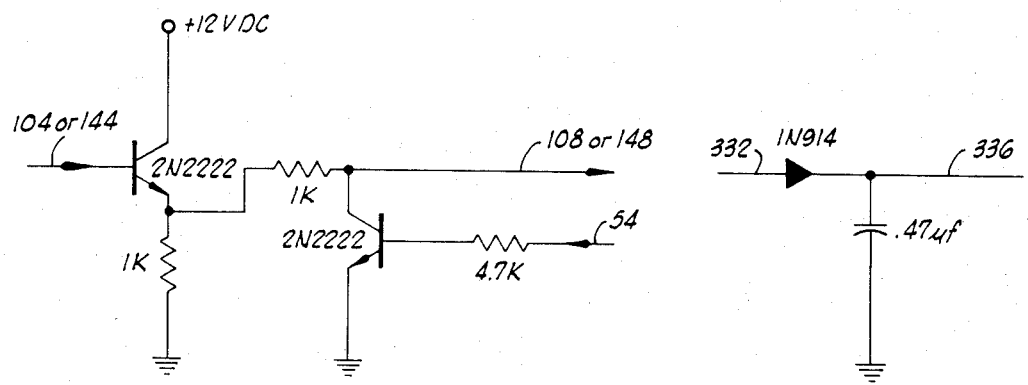
FIG. 17 is a schematic view of a typical blanking stage utilized in the white and black processing networks of the present invention.
FIG. 18 is a schematic view of a typical average level detector which is utilized in the monitoring system of the present invention.

Shown in FIG. 17 is a typical blanking stage, such as the blanking stages 106 and 146 shown in FIG. 1A.

Shown in FIG. 18 is an average level detector, such as the average level detector 334 shown in FIG. 1A. This circuit, the average level detector, preferably also is interposed in the signal path 184 so the output of the sync signal processing network 70 shown in FIG. 1A represents the average voltage value of the synchronizing signal.

Figure 19D:
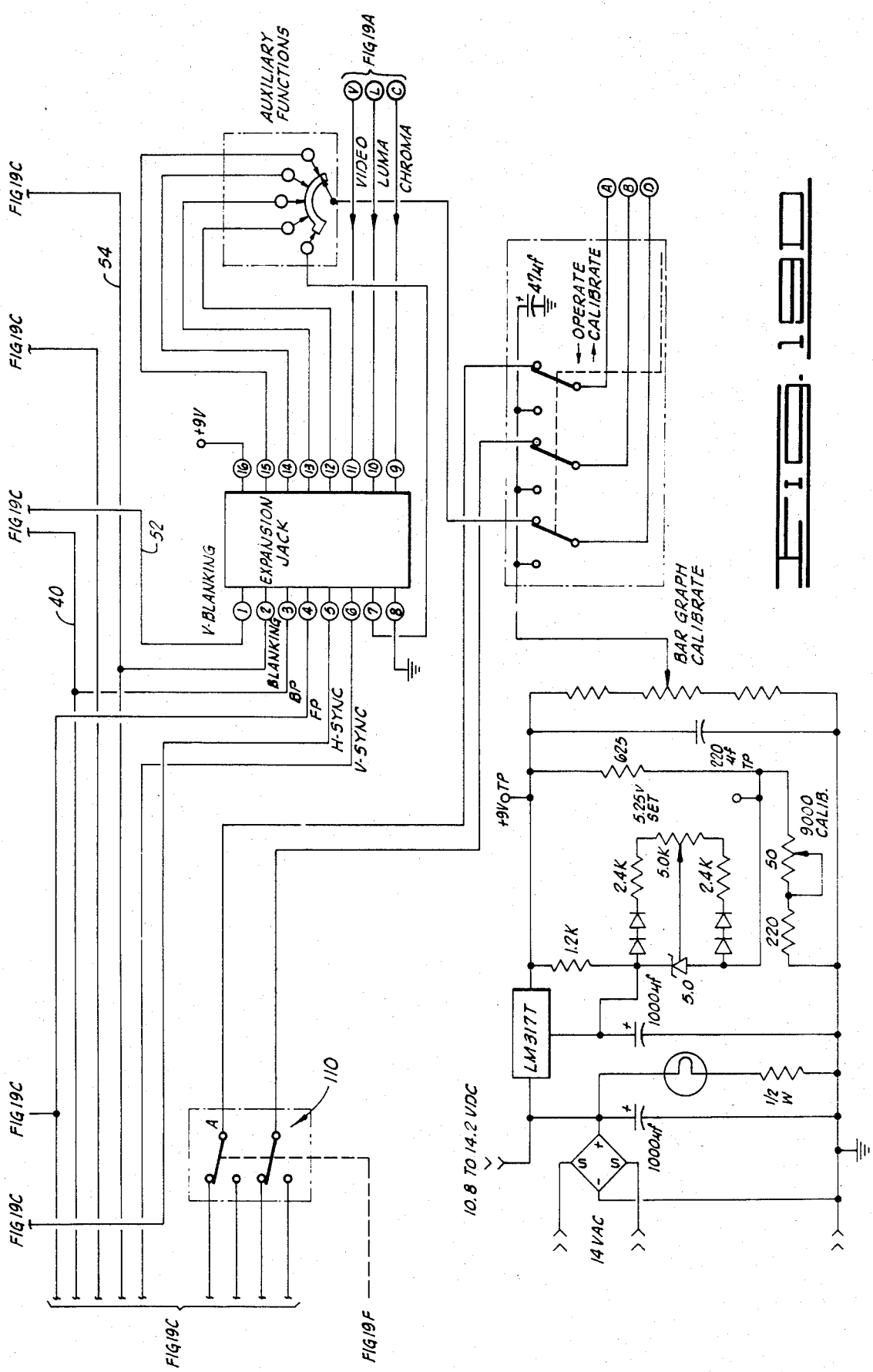
Figure 19E:
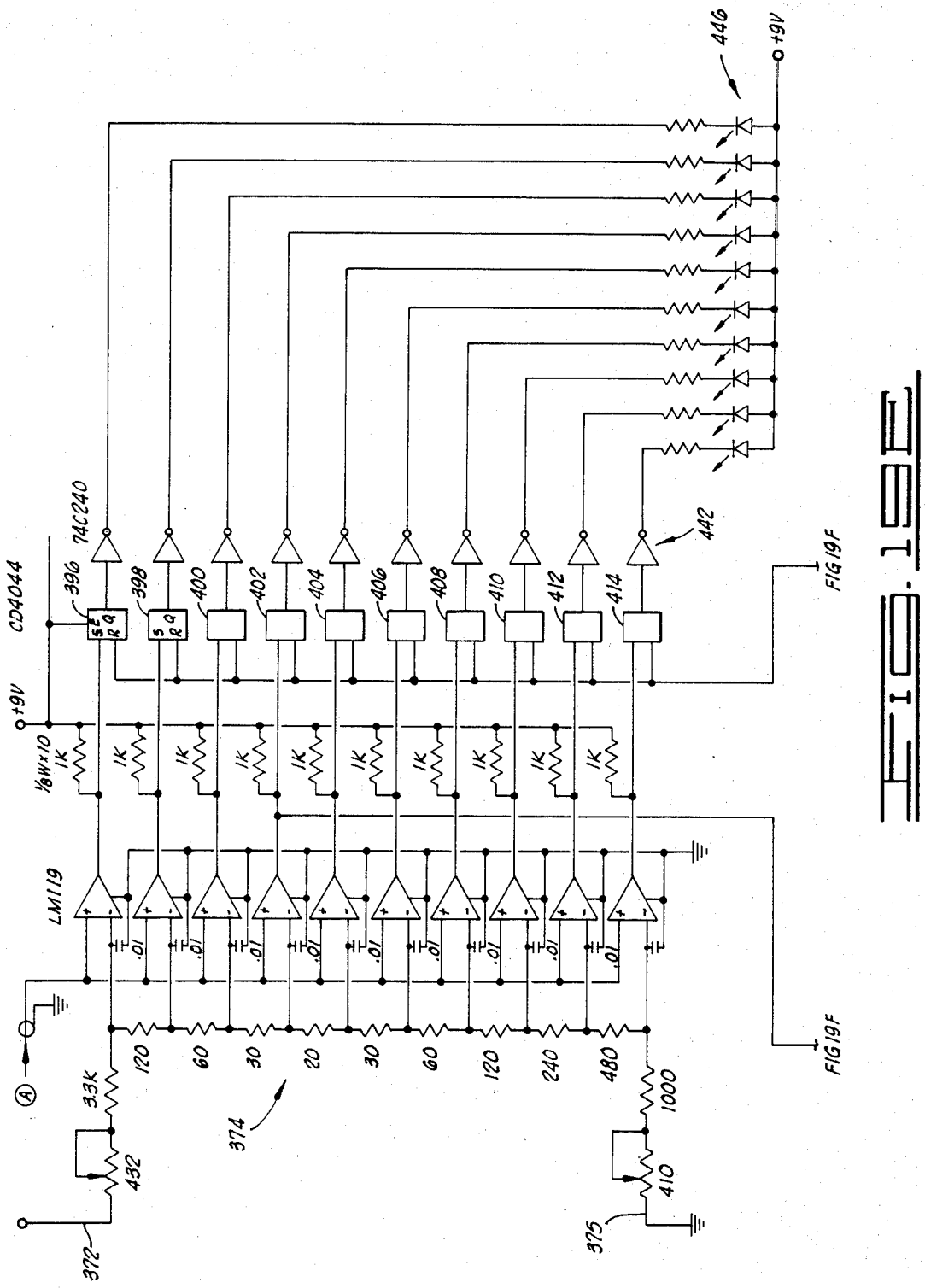

Shown in FIG. 19 (FIGS. 19A through 19F) is a schematic view of a monitoring system which is constructed in accordance with the present invention. This particular monitoring system includes a peak white level processing network, a peak black level processing network, a sync level processing network and a network for providing an average amplitude of the burst signal in a manner like that described before with respect to FIG. 1A. In other words, the monitoring system shown in FIG. 17 does not include a network for providing a peak chroma signal as does the monitoring system shown in FIG. 1A. Also, the monitoring system shown in FIG. 19 does include a bar graph display (FIG. 19E), like the bar graph display 446 shown in FIG. 1B and the monitoring system shown in FIG. 19 does include a circuit (FIG. 19F) for pulsing or strobing the monitored composite video signal, like that described before with respect to the astable multivibrator 486 shown in FIG. 1B. The display portion of the monitoring system shown in FIG. 19 does not include the displays associated with the generator keyer 476 and the numeric display 523 shown in FIG. 1B. The preclamp networks 118 and 158, the variable bandwidth limiters 126 and 166 and the negative clippers 134 and 174 in the black luminance processing network 66 and the sync signal processing network 70 have been combined in the monitoring system shown in FIG. 19, and the sync signal processing network 70 includes the average level detector, like the network shown in FIG. 18, interposed in the signal path 184 for the reasons mentioned before. In the system shown in FIG. 19, it is contemplated that there would be two digital to analog converters and associated displays as shown in FIG. 19E, one for receiving peak white luminance signals and burst signals and one for receiving peak black luminance signals and sync signals, although these could be combined in a single display or individual displays could be utilized if desired in particular applications.

Changes may be made in the various parts, elements and assemblies described herein and in the steps or sequence of steps of the methods described herein without departing from the spirit and the scope of the invention as defined in the following claims.

What is claimed is:

1. A method of continuously monitoring selected video parameters of a video signal wherein the video signal includes vertical blanking signals, and wherein the video signal includes at least one of a luminance signal having positive peaks and negative peaks, a chrominance signal having a peak voltage value and combinations thereof, the method comprising the steps of:
   inputting said video signal;
   determining at least one video parameter of the video signal from a group of video parameters selected from among: (1) an instantaneous peak voltage level of the positive peaks in the luminance signal; (2) an instantaneous peak voltage level of the negative peaks in the luminance signal; (3) the peak voltage value of the chrominance signal; and (4) combinations thereof; whereas each of said video parameters is movingly or randomly located or contained in the video signal outside the vertical blanking signal;
   comparing each selected video parameter with a reference DC voltage value selected to correspond with the selected video parameter; and
   providing a perceivable output indication of the comparison of each selected video parameter with the reference DC voltage value selected to correspond with the selected video parameter.

2. The method of claim 1 wherein the step of comparing the each selected video parameter with the reference DC voltage value further includes the step of:
   converting the results of the comparison of each selected video parameter with the reference DC voltage value selected to correspond with the selected video parameter to a digital form and using the digital form to determine a numeric percentage value.

3. The method of claim 2 wherein the step of providing the perceivable output indication further includes the steps of:
   receiving and holding each determined numeric percentage value; and
   updating each held numeric percentage value at predetermined time intervals during the monitoring of the selected video parameters of the video signal.

4. The method of claim 3 wherein the step of providing the perceivable output indication is further includes the step of:
   clearing each held numeric percentage value at predetermined time intervals.

5. The method of claim 3 wherein the step of providing the perceivable output indication further includes the step of:
   receiving each numeric percentage value in the digital form at the predetermined time intervals and displaying each numeric percentage value in a bar graph format to provide the visually perceivable output indication of each numeric percentage value.

6. The method of claim 3 wherein the step of providing the perceivable output indication further includes the steps of:
   receiving each numeric percentage value in the digital form via an encoder and providing an output signal for each numeric percentage value with each output signal representing one of the numeric percentage values as a numeral; and
   receiving the video signal and encoding the video signal with each numeral representing each numeric percentage value to provide the visually perceivable output indication.

7. The method of claim 3 wherein the step of providing the perceivable output indication further includes the steps of:
   receiving each numeric percentage value in the digital form via an encoder and providing an output signal for each numeric percentage value with each output signal representing one of the numeric percentage values as a numeral; and
   receiving each output signal representing one of the numeric percentage values as a numeral via a numeric display and displaying each numeral representing each numeric percentage value to provide the visually perceivable output indication.

8. The method of claim 1 wherein the step of comparing each selected video parameter with the reference DC voltage value further includes determining a numeric percentage value of each comparison of the selected video parameter with the reference dc voltage value, and wherein the step of providing the perceivable output indication further includes the steps of:
   receiving the video signal;
   comparing each numeric percentage value with a predetermined minimum numeric percentage value selected to correspond with the selected video parameter;
   providing an oscillating output signal in response to each comparison indicating the numeric percentage value is greater than the predetermined minimum numeric percentage value; and
   mixing each oscillating output signal with the video signal to provide a strobing video signal when the numeric percentage value is less than the predetermined minimum numeric percentage value to provide said visually perceivable output indication.

9. The method of claim 1 wherein the video signal includes the luminance signal, a mixed synchronizing signal comprising a vertical synchronizing signal and a horizontal synchronizing signal, a burst signal, a horizontal blanking signal and a vertical blanking signal, and wherein the method further includes the steps of:
   separating the mixed synchronizing signal from the video signal;
   separating the vertical synchronizing signal from the video signal;
   receiving the mixed synchronizing signal and generating a burst flag pulse signal in substantial timing and phase with the burst signal in the video signal; and
   receiving the mixed synchronizing signal and the vertical synchronizing signal and generating a mixed blanking signal in substantial timing and phase with the horizontal and vertical blanking signals in the video signal;
and wherein the selected video parameter is the instantaneous peak voltage level of the positive peaks in the luminance signal, and wherein the step of determining the instantaneous peak voltage level of the positive peaks in the luminance signal further includes the steps of:

separating the luminance signal from the video signal;

receiving the luminance signal and attenuating high frequencies in the luminance signal via a variable bandwidth limiter; and receiving the burst flag pulse signal and the luminance signal via a back porch clamp and clamping the luminance signal to a predetermined DC voltage value.

10. The method of claim 9 wherein the step of determining the instantaneous peak voltage level of the positive peaks in the luminance signal further includes the step of:

receiving and luminance signal from the back porch clamp and receiving the mixed blanking signal and blanking the received luminance signal to remove information present during a period of time slightly beyond the blanking intervals to provide the positive peaks in the luminance signal referenced to the predetermined reference DC voltage value.

11. The method of claim 1 wherein the video signal includes the luminance signal, a mixed synchronizing signal comprising a vertical synchronizing signal and a horizontal synchronizing signal, a burst signal, a horizontal blanking signal and a vertical blanking signal, and wherein the method further includes the steps of:

separating the mixed synchronizing signal from the video signal;

separating the vertical synchronizing signal from the video signal;

receiving the mixed synchronizing signal and generating a burst flag pulse signal in substantial timing and phase with the burst signal in the video signal; and receiving the mixed synchronizing signal and the vertical synchronizing signal and generating a mixed blanking signal in substantial timing and phase with the horizontal and vertical blanking signals in the video signal;

and wherein the selected video parameter is the instantaneous peak voltage level of the negative peaks in the luminance signal, and wherein the step of determining the instantaneous peak voltage level of the negative peaks in the luminance signal further includes the steps of:

separating the luminance signal from the video signal;

receiving the luminance signal and attenuating high frequencies in the luminance signal via a variable bandwidth limiter; and receiving the burst flag pulse signal and the luminance signal via a back porch clamp and clamping the received luminance signal to a predetermined DC voltage value.

12. The method of claim 11 wherein the step of determining the instantaneous peak DC voltage level of the negative peaks in the luminance signal further includes the step of:

receiving the luminance signal from the back porch clamp and receiving the mixed blanking signal and blanking the received luminance signal to remove information present during a time period slightly beyond the blanking intervals to provide the negative peaks in the luminance signal referenced to the predetermined DC voltage value.

13. The method of claim 1 wherein the video signal includes the chrominance signal and a mixed blanking signal comprising a vertical blanking signal and a horizontal blanking signal, and wherein the selected video parameter is the peak voltage value of the chrominance signal, and wherein the step of determining the peak voltage value of the chrominance signal is defined further to include the step of:

separating the chrominance signal from the video signal;

receiving the chrominance signal and the mixed blanking signal and passing the received chrominance signal only during an active part of a video scan line when not receiving horizontal and vertical blanking signals; and receiving the chrominance signal passed during the active part of the video scan line and providing the peak voltage value of the chrominance signal.

14. An apparatus for continuously monitoring selected video parameters of a video signal, wherein the video signal includes at least one of a luminance signal having positive peaks and negative peaks and a chrominance signal having a peak voltage value, the apparatus comprising:

means for receiving the video signal;

means for determining at least one video parameter of the video signal from a group of video parameters selected from among: (1) an instantaneous peak voltage level of the positive peaks of the luminance signal; (2) an instantaneous peak voltage level of the negative peaks of the luminance signal; (3) the peak voltage value of the chrominance signal; and (4) combinations thereof; whereas each of said video parameters is movingly or randomly located or contained in the video signal outside the vertical blanking signal;

means for comparing each selected video parameter with a reference DC voltage value selected to correspond with the selected video parameter; and means for providing a perceivable output indication of the comparison of each selected video parameter with the reference DC voltage value selected to correspond with the selected video parameter.

15. The apparatus of claim 14 wherein the video signal includes the luminance signal, and wherein the selected video parameter is the instantaneous peak voltage level of the positive peaks in the luminance signal wherein the apparatus further includes:

a chrominance luminance separator receiving the video signal and separating the luminance signal from the video signal; and wherein the means for comparing each selected video parameter with the reference DC voltage value further includes:

a peak white level processing network receiving the luminance signal and determining the instantaneous peak voltage level of the positive peaks in the luminance signal and providing an output signal indicative of the instantaneous peak voltage level of the positive peaks in the luminance signal; and means for receiving the output signal indicative of the instantaneous peak voltage level of the positive peaks in the luminance signal and comparing the instantaneous peak voltage level of the positive peaks in the luminance signal with the reference DC voltage value selected to correspond to the selected video parameter of the instantaneous peak voltage level of the positive peaks in the luminance signal to determine a numeric percentage value; and wherein the means for providing said visually perceivable output indication further includes:

a display receiving the numeric percentage value and providing said perceivable output indication of the numeric percentage value comparison of the instantaneous peak voltage level of the positive peaks in the luminance signal with the reference DC voltage value.

16. The apparatus of claim 15 wherein the video signal includes a mixed synchronizing signal comprising a vertical synchronizing signal and a horizontal synchronizing signal, a burst signal, a horizontal blanking signal and vertical blanking signal, and wherein the apparatus further includes:
- a sync separator for receiving the video signal and for separating the mixed synchronizing signal from the video signal, and for separating the vertical synchronizing signal from the video signal;
- a burst flag pulse generator receiving the mixed synchronizing signal and generating a burst flag pulse signal in substantial timing and phase with the burst signal in the video signal; and
- a blanking generator receiving the mixed synchronizing signal and the vertical synchronizing signal and generating a mixed blanking signal in substantial timing and phase with the horizontal and vertical blanking signals in the video signal;

and wherein the peak white level processing network further includes:
- a variable bandwidth limiter receiving the luminance signal and attenuating high frequencies in the luminance signal;
- a back porch clamp receiving the burst flag pulse signal and the luminance signal and clamping the received luminance signal to a predetermined DC voltage value; and
- a blanking stage for receiving the luminance signal from the back porch clamp and receiving the mixed blanking signal and blanking the luminance signal to remove information present during a period of time slightly beyond the blanking intervals to provide the positive peaks in the luminance signal referenced to the predetermined DC value.

17. The apparatus of claim 14 wherein the video signal includes the luminance signal, and wherein the selected video parameter is the instantaneous peak voltage level of the negative peaks in the luminance signal and wherein the apparatus further includes:
- a chrominance luminance separator receiving the video signal and separating the luminance signal from the video signal; and wherein the means for comparing each selected video parameter with the reference DC voltage value further includes:
- a peak black level processing network receiving the luminance signal and determining the instantaneous peak voltage level of the negative peaks in the luminance signal and providing an output signal indicative of the instantaneous peak DC voltage level of the negative peaks in the luminance signal; and
- means for receiving the output signal indicative of the instantaneous peak voltage level of the negative peaks in the luminance signal and comparing the instantaneous peak voltage level of the negative peaks in the luminance signal with the reference DC voltage value selected to correspond to the selected video parameter of the instantaneous peak voltage level of the negative peaks in the luminance signal to determine a numeric percentage value; and wherein the means for providing said perceivable output indication further includes:
- a display for receiving the determined numeric percentage value and providing said perceivable output indication of the determined numeric percentage value comparison of the instantaneous peak voltage level of the negative peaks in the luminance signal with said reference DC voltage value.

18. The apparatus of claim 17 wherein the video signal includes a mixed synchronizing signal comprising a vertical synchronizing signal and a horizontal synchronizing signal, a burst signal and a horizontal blanking signal and a vertical blanking signal, and wherein the apparatus further includes:
- a sync separator for receiving the video signal and for separating the mixed synchronizing signal from the video signal, and for separating the vertical synchronizing signal from the video signal;
- a burst flag pulse generator for receiving the mixed synchronizing signal and generating a burst flag pulse signal in substantial timing and phase with the burst signal in the video signal; and
- a blanking generator for receiving the mixed synchronizing signal and the vertical synchronizing signal and generating a mixed blanking signal in substantial timing and phase with the horizontal and vertical blanking signals in the video signal;

and wherein the peak black level processing network further includes:
- a variable bandwidth limiter for receiving the luminance signal and attenuating high frequencies in the luminance signal via a variable bandwidth limiter;
- a back porch clamp for receiving the burst flag pulse and the luminance signal and clamping the luminance signal to a predetermined DC voltage value; and
- a blanking stage for receiving the luminance signal from the back porch clamp and receiving the mixed blanking signal and blanking the luminance signal to remove information present during a time period slightly beyond the blanking intervals to provide the negative peaks in the luminance signal referenced to the dc voltage value.

19. The apparatus of claim 14 wherein the video signal includes the chrominance signal, and wherein the selected video parameter is the peak voltage value of the chrominance signal and wherein the apparatus further includes:
- a chrominance luminance separator receiving the video signal and separating the chrominance signal from the video signal; and wherein the means for comparing the selected video parameter with the reference DC voltage value further includes:
- means for comparing the peak voltage value of the chrominance signal with the reference DC voltage value to determine a numeric percentage value; and wherein the means for providing the perceivable output indication further includes:
- a display receiving the numeric percentage value and providing said output indication of the determined numeric percentage value comparison of the peak voltage value of the chrominance signal with the reference DC voltage value selected to correspond with the video parameter of the peak voltage value of the chrominance signal.

20. The apparatus of claim 14 wherein the means for comparing each selected video parameter with the reference DC voltage value further includes:
means for converting the results of the comparison of each selected video parameter with the reference DC voltage value selected to correspond with the selected video parameter to a digital form and using the digital form to determine a numeric percentage value.

21. The apparatus of claim 20 wherein the means for providing the perceivable output indication further includes:
means for receiving and holding each determined numeric percentage value; and
means for updating each held numeric percentage value at predetermined time intervals during the monitoring of the selected video parameters.

22. The apparatus of claim 21 wherein the means for providing the perceivable output indications further includes:
means for clearing each held numeric percentage value at predetermined time intervals.

23. The apparatus of claim 21 wherein the means for providing the perceivable output indication further includes:
means for receiving each numeric percentage value in the digital form at the predetermined time intervals and displaying each received numeric percentage value in a bar graph format to provide the visually perceivable output indication of the numeric percentage value.

24. The apparatus of claim 20 wherein the means for providing the perceivable output indication further includes:
means for receiving each numeric percentage value in the digital form via an encoder and providing each numeric percentage value as a numeral; and
means for receiving the video signal and encoding the video signal with each numeral representing each numeric percentage value respectively, to provide the visually perceivable output indication.

25. The apparatus of claim 20 wherein the means for providing the perceivable output indication further includes:
means for receiving each numeric percentage value in the digital form via an encoder and providing each numeric percentage value as a numeral; and
means for receiving each numeric percentage value as a numeral via a numeric display and displaying each numeral representing each numeric percentage value respectively, to provide the visually perceivable output indication.

26. The apparatus of claim 20 wherein the means for providing the perceivable output indication further includes:
means for receiving the video signal;
means for providing an oscillating output signal in response to receiving any one numeric percentage value greater than a predetermined minimum numeric percentage value selected to correspond with the selected video parameter; and
means for mixing the oscillating output signal with the video signal to provide a strobing video signal when any numeric percentage value is greater than the predetermined minimum numeric percentage value selected to correspond with the selected video parameter to provide the visually perceivable output indication.

* * * * *